(12) United States Patent
Ohki

(10) Patent No.: US 11,662,446 B2
(45) Date of Patent: May 30, 2023

(54) RANGING SENSOR, DETECTION SENSOR, RANGING METHOD, AND ELECTRONIC DEVICE

(71) Applicant: Sony Semiconductor Solutions Corporation, Kanagawa (JP)

(72) Inventor: Mitsuharu Ohki, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 235 days.

(21) Appl. No.: 16/757,007

(22) PCT Filed: Sep. 13, 2019

(86) PCT No.: PCT/JP2019/036121
§ 371 (c)(1),
(2) Date: Apr. 30, 2020

(87) PCT Pub. No.: WO2020/084955
PCT Pub. Date: Apr. 30, 2020

(65) Prior Publication Data
US 2021/0239807 A1    Aug. 5, 2021

(30) Foreign Application Priority Data
Oct. 24, 2018  (JP) .............................. JP2018-199793

(51) Int. Cl.
*G01S 17/08*         (2006.01)
*G01S 17/10*         (2020.01)
(Continued)

(52) U.S. Cl.
CPC .............. *G01S 7/497* (2013.01); *G01S 17/08* (2013.01); *G01S 17/931* (2020.01)

(58) Field of Classification Search
USPC .................................. 356/3, 3.02, 3.03, 3.05
See application file for complete search history.

(56) References Cited

U.S. PATENT DOCUMENTS

2003/0123869 A1* 7/2003 Kohno ..................... G02B 7/32
                                                         396/106
2005/0225743 A1* 10/2005 Chang ..................... G01S 7/481
                                                         356/5.01
(Continued)

FOREIGN PATENT DOCUMENTS

JP    03-029811 A    2/1991
JP    07-042946 U    8/1995
(Continued)

*Primary Examiner* — Daquan Zhao
(74) *Attorney, Agent, or Firm* — Michael Best & Friedrich LLP

(57) ABSTRACT

Provided is a ranging sensor (2), including: a light emitting unit (110) that applies light to a target; a light receiving unit (120) that receives light from the light emitting unit (110) reflected from the target; and a calculation unit (150) that calculates a distance from the light receiving unit (120) to the target based on light reception data acquired by the light receiving unit (120). The calculation unit (150) compares detection light reception data with predetermined data, the detection light reception data being obtained as light is emitted from the light emitting unit (110) to a reference object provided at a predetermined distance and the light of the light emitting unit (110) reflected by the reference object is received by the light receiving unit (120), and controls notification processing to a user.

13 Claims, 40 Drawing Sheets

(51) Int. Cl.
　　　*G01S 17/32*　　　(2020.01)
　　　*G01S 7/497*　　　(2006.01)
　　　*G01C 3/06*　　　　(2006.01)
　　　*G01S 17/931*　　　(2020.01)

(56) References Cited

U.S. PATENT DOCUMENTS

| | | | |
|---|---|---|---|
| 2019/0383939 A1* | 12/2019 | Mori | G05B 19/41895 |
| 2020/0018836 A1* | 1/2020 | Nakamura | G01S 7/4915 |
| 2021/0072383 A1* | 3/2021 | Noguchi | G01S 17/32 |

FOREIGN PATENT DOCUMENTS

| | | |
|---|---|---|
| JP | 2015-232456 A | 12/2015 |
| KR | 10-2006-0061619 A | 6/2006 |
| KR | 10-2014-0045631 A | 4/2014 |
| WO | 2009/098864 A1 | 8/2009 |

* cited by examiner

RANGING SENSOR, DETECTION SENSOR, RANGING METHOD, AND ELECTRONIC DEVICE

FIELD

The present disclosure relates to a ranging sensor, a detection sensor, a ranging method, and an electronic device.

BACKGROUND

In recent years, various technologies for various sensors have been developed. For example, Patent Literature 1 describes a ranging sensor, and discloses a technology for improving the reliability of the ranging sensor. Specifically, Patent Literature 1 discloses a technology for manufacturing a ranging sensor and investigating the accuracy of the sensor at a stage of factory shipping.

CITATION LIST

Patent Literature

Patent Literature 1: Japanese Patent Application Laid-open No. H3-29811

SUMMARY

Technical Problem

In the above-mentioned sensor, however, aged deterioration may occur and the accuracy of the sensor may decrease depending on use environments when used. Users cannot know the state of aged deterioration of the sensor during measurement, or know whether accurate data is obtained under usage environments. In view of the above-mentioned circumstances, the development of a technology for enabling users to check the operation reliability of the sensor as appropriate has been sought after.

Solution to Problem

According to the present disclosure, a ranging sensor is provided that includes: a light emitting unit that applies light to a target; a light receiving unit that receives light from the light emitting unit reflected from the target; and a calculation unit that calculates a distance from the light receiving unit to the target based on light reception data acquired by the light receiving unit, wherein the calculation unit compares detection light reception data with predetermined data, the detection light reception data being obtained as light is emitted from the light emitting unit to a reference object provided at a predetermined distance and the light of the light emitting unit reflected by the reference object is received by the light receiving unit, and controls notification processing to a user.

Moreover, according to the present disclosure, a detection sensor is provided that includes: a light receiving unit that receives light from outside; and a calculation unit that processes light reception data acquired by the light receiving unit, wherein the calculation unit compares detection light reception data with predetermined data, the detection light reception data being obtained as the light receiving unit receives light from a reference object provided at a predetermined distance, and controls notification processing to a user.

Moreover, according to the present disclosure, a ranging method is provided that includes: applying first light to a target; receiving the first light reflected from the target; calculating a distance from an irradiation point of the first light to the target based on light reception data acquired by receiving the first light; applying second light to a reference object provided at a predetermined distance; and comparing detection light reception data with predetermined data, the detection light reception data being acquired by receiving the second light reflected by the reference object, and controlling notification processing to a user.

Moreover, according to the present disclosure, an electronic device is provided that includes a ranging sensor that protrudes from a casing when used, the ranging sensor includes: a light emitting unit configured to apply light to a target; a light receiving unit configured to receive light from the light emitting unit reflected from the target; and a calculation unit configured to calculate a distance from the light receiving unit to the target based on light reception data acquired by the light receiving unit, wherein the calculation unit compares detection light reception data with predetermined data, the detection light reception data being acquired as light is emitted from the light emitting unit to a reference object provided in the casing at a predetermined distance and the light of the light emitting unit reflected by the reference object is received by the light receiving unit, and controls notification processing to a user.

DESCRIPTION OF EMBODIMENTS

Figure 1:
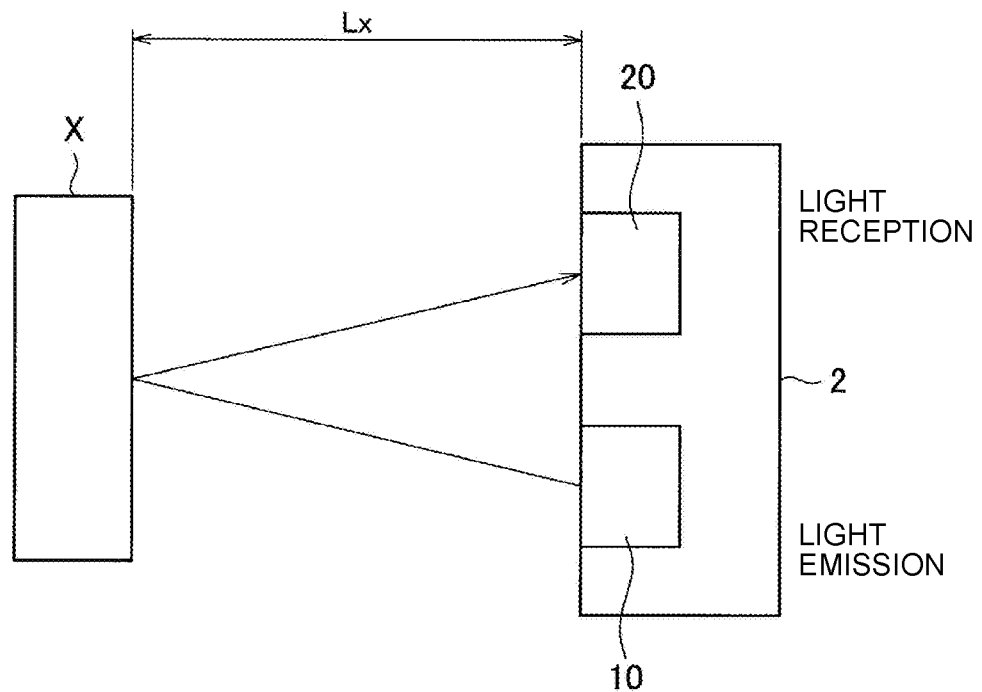
FIG. 1 is a diagram illustrating an example of a ranging sensor.

Referring to the accompanying drawings, preferred embodiments of the present disclosure are described in detail below. In the specification and the drawings, components having substantially the same functional configurations are denoted by the same reference symbols, and overlapping descriptions thereof are omitted.

The descriptions are given in the following order:
1. Technical overview
2. First embodiment (deviation detection and correction)
   2.1. Pop-up type
      2.1.1. Outer appearance
      2.1.2. Configuration and functions
      2.1.3. Operation flow for deviation detection
      2.1.4. Calculation of corrected distance
   2.2. Cradle type
      2.2.1. Outer appearance
      2.2.2. Operation flow for deviation detection
      2.2.3. Operation flow for deviation correction
3. Second embodiment (deviation detection of light emitting unit)
   3.1. Pop-up type
      3.1.1. Configuration and functions
      3.1.2. Operation flow for deviation detection
   3.2. Cradle type
      3.2.1. Configuration
      3.2.2. Operation flow for deviation detection
4. Third embodiment (deviation detection of light receiving unit)
   4.1. Deviation detection
      4.1.1. Pop-up type
          4.1.1.1. Configuration and functions
          4.1.1.2. Operation flow for deviation detection
      4.1.2. Cradle type
          4.1.2.1. Configuration
          4.1.2.2. Operation flow for deviation detection
   4.2. Black level correction
      4.2.1. Pop-up type
          4.2.1.1. Configuration
          4.2.1.2. Correction flow for black level 4.2.2. Cradle type
    4.2.2.1. Configuration
    4.2.2.2. Operation flow for deviation detection
5. Applications to electronic device
6. Applications to mobile body

1. Technical Overview

Referring to FIG. 1, the technical overview is described by way of a ranging sensor as an example of a detection sensor. FIG. 1 is a diagram illustrating an example of the ranging sensor. A ranging sensor 2 includes, in the ranging sensor 2, a light emitting unit 10 configured to apply light and a light receiving unit 20 configured to receive light applied by the light emitting unit 10. The ranging sensor 2 applies light from the light emitting unit 10 to a target X, and receives light reflected from the target X by the light receiving unit 20, thereby measuring a distance Lx from the ranging sensor 2 to the target X. For example, a lens structure for efficiently condensing light reflected from the target X is provided on the light receiving side of the light receiving unit 20. For example, a diffuser for enabling light to be applied to the entire target X is provided on the light emission side of the light emitting unit 10.

In such a ranging sensor 2, a deviation may occur in measurement of a distance due to aged deterioration or use environments while the ranging sensor 2 is repeatedly used. The measurement deviation may occur when a deviation occurs between a start timing of application of light from the light emitting unit 10 and a start timing of light reception of the light receiving unit 20. The reason is that the ranging sensor 2 measures a reciprocating time of light to the target X on the assumption that the ranging sensor 2 has already known an emission timing indicating the start of application of light from the light emitting unit 10 and a light reception timing of starting the light reception by the light receiving unit. The ranging sensor 2 calculates the distance from the ranging sensor 2 to the target X by multiplying the reciprocating time of light by light speed and dividing the resultant by 2. Thus, if a deviation occurs between the emission timing and the light reception timing, an offset is added to measured distance data by a value obtained by multiplying the deviated time by light speed and dividing the resultant by 2, with the result that the measured distance has a deviation.

In the technology in the present disclosure, before a user uses the ranging sensor 2 to calculate the distance from the ranging sensor 2 to the target X, the operation reliability such as the probability of occurrence of measurement deviations in the ranging sensor 2 is presented to the user to improve the use comfortability for the user. When a measurement deviation has occurred in the ranging sensor 2, a distance to the target X with a corrected measurement deviation is calculated as a corrected distance. Consequently, the user can more accurately measure a distance.

2. First Embodiment

In this section, by way of a pop-up type structure and a cradle type structure as examples of a structure for detecting that a measurement deviation can occur in the ranging sensor 2, a method for detecting a measurement deviation and a method for correcting the measurement deviation are described.

(2.1. Pop-Up Type)
(2.1.1. Outer Appearance)

Figure 2:
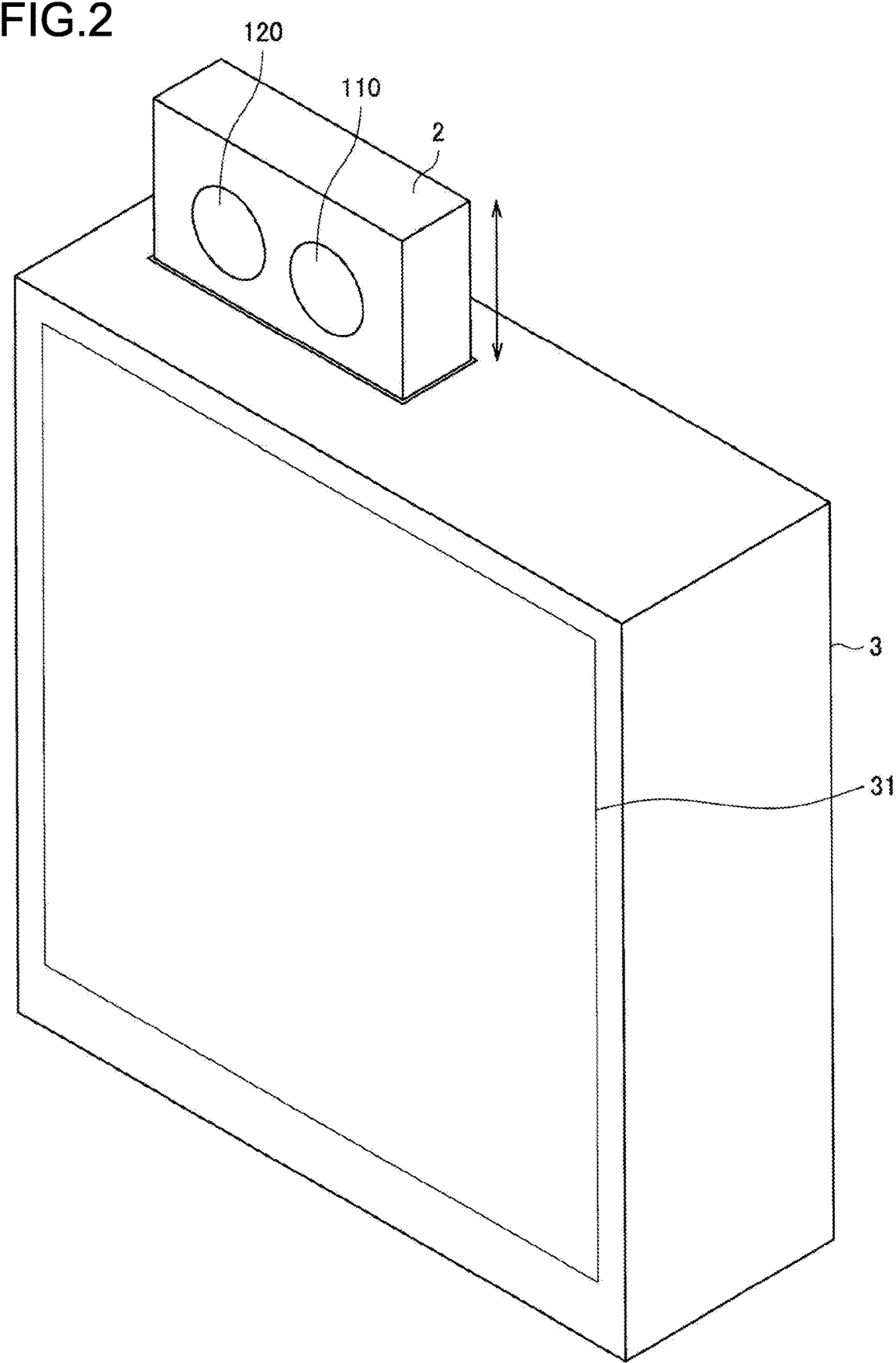
FIG. 2 is a diagram illustrating an example of a detection sensor according to a first embodiment of the present disclosure.

First, a pop-up type ranging sensor 2 is described with reference to FIG. 2. FIG. 2 is a diagram illustrating an example of a casing 3 of an information processing terminal provided with the pop-up type ranging sensor 2. For example, the casing 3 is a rectangular parallelepiped, and is provided with the ranging sensor 2 on one of the six surfaces. The ranging sensor 2 is provided so as to appear from the casing 3, that is, so as to protrude from the casing 3. For example, when the ranging sensor 2 is used (for example, when a distance is measured by the ranging sensor 2), the ranging sensor 2 appears from the casing 3 so that the distance can be measured, and when the distance is not measured by the ranging sensor 2, the ranging sensor 2 is buried in the casing 3. The provision of such a structure improves the portability of the casing 3. Examples of the information processing terminal include an electronic device such as a smartphone.

In the ranging sensor 2, a light emitting unit 110 and a light receiving unit 120 are provided, and when the ranging sensor 2 appears from the casing 3, the light emitting unit 10 applies light to a target X, and light applied from the light emitting unit 10 and reflected from the target X is received by the light receiving unit 20, thereby measuring a distance Lx from the ranging sensor 2 to the target X.

In the casing 3, a reference object for enabling measurement deviation of the light emitting unit 110 and the light receiving unit 120 to be detected is provided at a position opposed to the light emitting unit 110 and the light receiving unit 120. By using the reference object, the measurement deviation can be detected. A display region 31 is provided on one surface of the casing 3, and a user can check a detection result of the measurement deviation. In the first embodiment, the detection result is displayed on the display region to present the detection result to the user. However, when the information processing terminal has an output device for voice, the detection result may be presented to the user by voice.

(2.1.2. Configuration and Functions)

Figure 3:
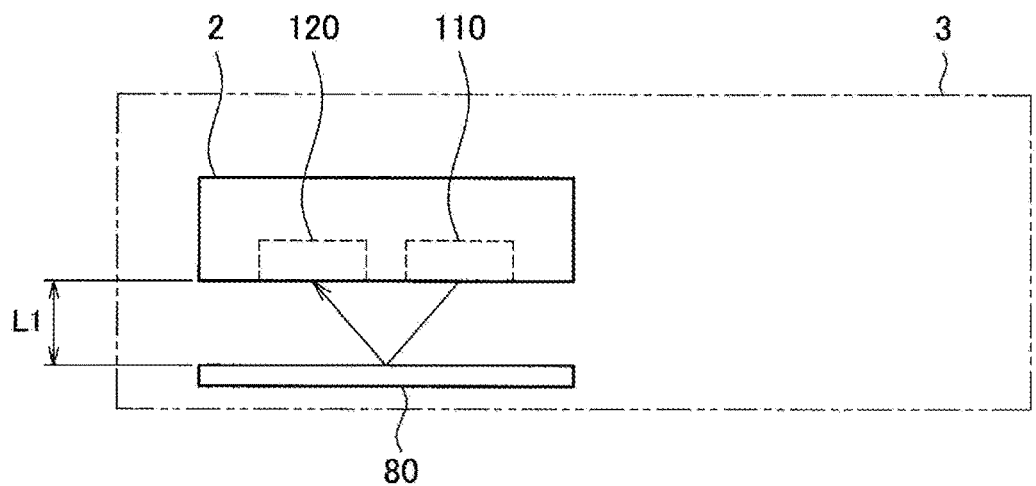
FIG. 3 is a diagram illustrating an example of a structure of the detection sensor according to the first embodiment.
Figure 4:
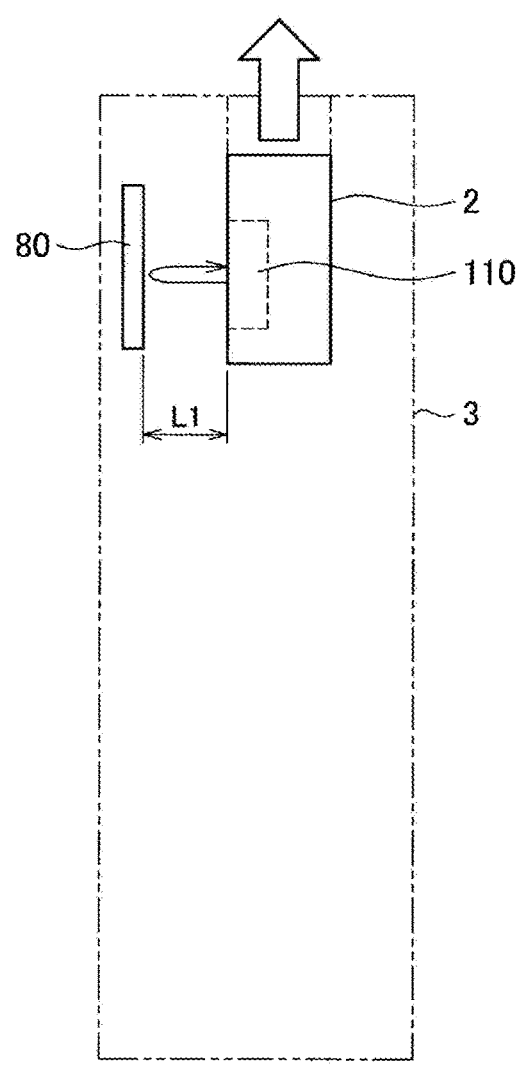
FIG. 4 is a diagram illustrating an example of the structure of the detection sensor according to the first embodiment.

Referring to FIG. 3 and FIG. 4, the structure and functions of a casing of an information processing terminal provided with the pop-up type ranging sensor 2 are described. FIG. 3 is a diagram illustrating the casing 3 illustrated in FIG. 2 as seen from immediately above one surface on which the ranging sensor is provided. FIG. 4 is a diagram illustrating the casing 3 illustrated in FIG. 2 as seen from the side.

Referring to FIG. 3, the casing 3 is provided with a mirror 80 as a reference object so as to be opposed to the ranging sensor 2 with a distance L1. The ranging sensor 2 applies light from the light emitting unit 110 to the mirror 80, and receives light reflected from the mirror 80 by the light receiving unit 120, thereby detecting measurement deviation. The distance L1 may be any length as long as the distance to the mirror 80 is known.

Referring to FIG. 4, the ranging sensor 2 is provided on one side in a direction in which the long sides of the casing 3 extend when the casing 3 is seen from the side, and the mirror 80 is provided to be opposed to the ranging sensor 2 in a direction in which the short sides of the ranging sensor 2 extend. The ranging sensor 2 is movable in the direction in which the long sides of the casing 3 extend, and can appear from the casing 3. The measurement deviation is detected by using the mirror 80 when the ranging sensor 2 is buried in the casing 3.

Figure 5:
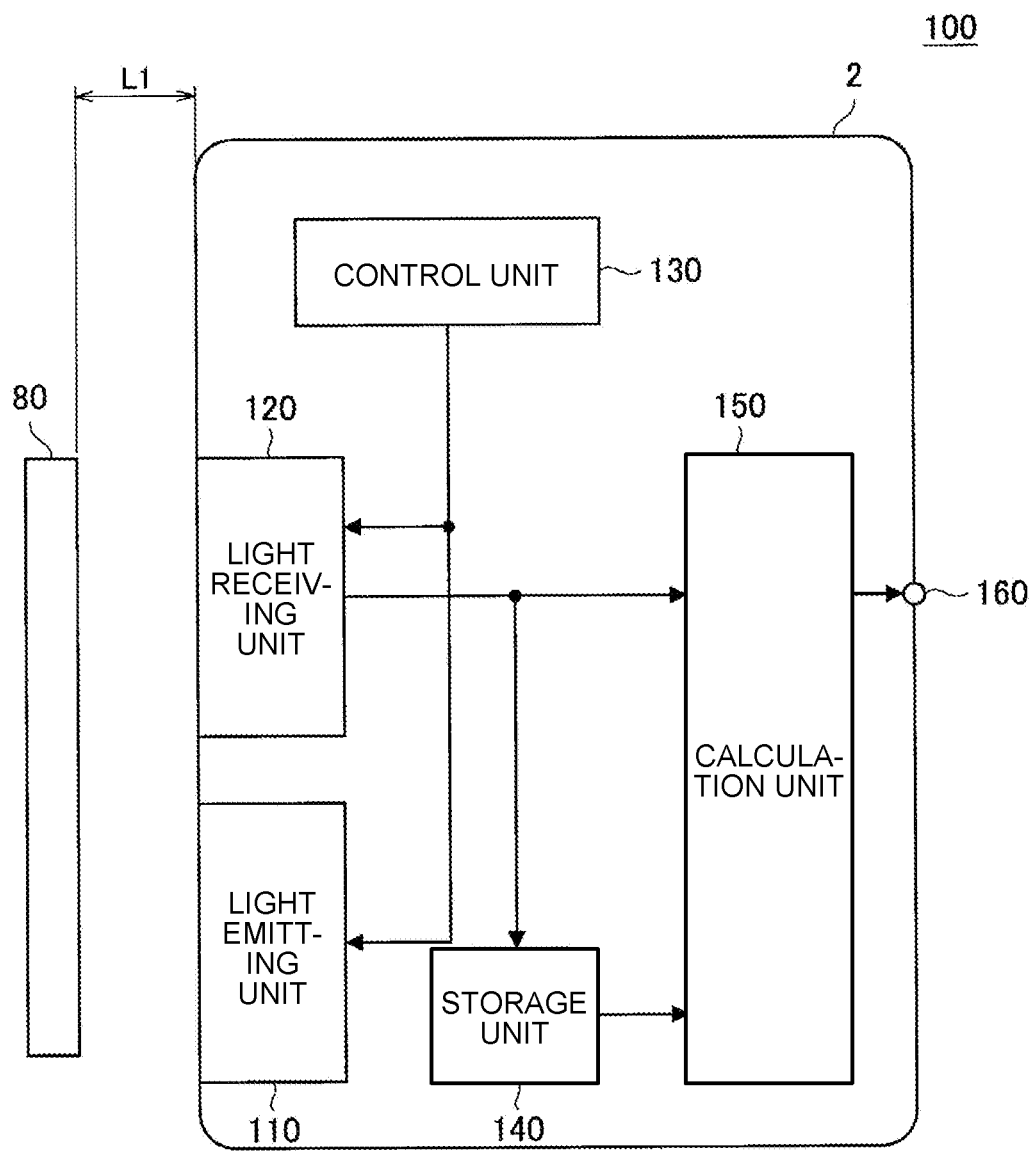
FIG. 5 is a block diagram illustrating an example of a mechanism of the detection sensor according to the first embodiment.

Referring to FIG. 5, various structures and functions included in the casing 3 are described. FIG. 5 is a block diagram illustrating an example of a detection mechanism having various structures for detecting measurement deviation. A detection mechanism 100 for measurement deviation includes the ranging sensor 2 and the mirror 80 provided to be opposed to the ranging sensor 2.

The ranging sensor 2 is provided with a light emitting unit 110, a light receiving unit 120, a control unit 130, a storage unit 140, a calculation unit 150, and an output terminal 160.

The light emitting unit 110 has a function for applying light to the mirror 80 as a reference object. For example, the light emitting unit 110 includes a light emitting diode (LED) light source for emitting infrared light, and turns on and off the emission of infrared light under control of the control unit 130. The light emitting unit 110 can emit infrared light with a predetermined emission pattern (on/off repetition pattern).

The light receiving unit 120 has a function for receiving light emitted from the light emitting unit 110 and reflected from the mirror 80, and generating light reception data. The light receiving unit 120 outputs the generated light reception data to the storage unit 140. The light reception data may be various kinds of data such as the received amount of light and color. The light receiving unit 120 also has a function for receiving light emitted from the light emitting unit 110 and reflected from a target X, and generating measurement data used to measure a distance from the light emitting unit 110 to the target X.

The light receiving unit 120 only needs to receive light by at least an infrared light (IR) method. For example, the light receiving unit 120 may be an RGB sensor including an infrared sensor.

The ranging sensor 2 measures a distance by the light receiving unit 120 receiving light emitted by the light emitting unit 110 as described above. As a method in which light is emitted by the light emitting unit 110 and the light is received by the light receiving unit 120 to measure a distance, a method (dToF method) in which infrared light is pulse-applied and a time during which the light is reflected by the surface of a subject and returned is directly measured and a method (iToF method) in which infrared light is modulated and a distance is calculated based on a phase difference between the phase of light during application and the phase of light reflected and returned can be exemplified.

The light receiving unit 120 may measure a distance to a subject by using a structured light method. The structured light method is a method for projecting a specially designed optical pattern to the surface of an object and analyzing deformation of the projected pattern to estimate a distance to the object.

The control unit 130 has a function for instructing the light emitting unit 110 and the light receiving unit 120 to emit light and receive light. The control unit 130 instructs the light emitting unit 110 to emit light, and the light emitting unit 110 applies light in response to the instruction. When the control unit 130 instructs the light receiving unit 120 to receive light, the light receiving unit 120 starts to receive light in response to the instruction.

The storage unit 140 has a function for acquiring and storing light reception data or measurement data obtained by the light receiving unit 120. The storage unit 140 stores data permanently and can store data temporarily.

The light reception data includes reference data obtained from light reflected from the reference object, which is acquired in advance, and detection light reception data obtained from light reflected from the reference object in detecting measurement deviation. The reference data may be reference data acquired in advance by receiving light reflected from a reference object at the time of shipping or manufacturing of the ranging sensor.

The calculation unit 150 has a function for calculating a distance to a target based on an emission timing by the light emitting unit 110 and a light receiving timing by the light receiving unit 120. Specifically, the calculation unit 150 calculates the distance by using a time during which light applied from the light emitting unit 110 contacts a target and reflection light from the target returns to the light receiving unit. The calculation unit 150 multiplies the reciprocating time of the light by the light speed and divides the resultant by 2 to calculate a distance from the ranging sensor 2 to the target X.

Before calculating the distance to the target X, the calculation unit 150 acquires detection light reception data obtained when light applied from the light emitting unit 110 contacts the mirror 80 as a reference object and reflection light from the mirror 80 is received by the light receiving unit 120.

The calculation unit 150 has a function for comparing reference data stored in the storage unit 140 with detection light reception data, and controlling notification processing to a user. The notification processing to the user is not limited to display, and may be performed by voice or by display and voice in combination. The notification processing to the user may be processing for changing a part of operation performed by the ranging sensor 2 or an information processing terminal provided with the ranging sensor 2.

The calculation unit 150 further calculates a difference between the reference data and the detection light reception data, and determines whether the difference is present, thereby controlling notification processing to a user. Specifically, the calculation unit 150 may determine whether the difference falls within a predetermined range. When the difference is equal to or larger than the predetermined range, the calculation unit 150 determines that there is a difference between the predetermined data and the detection light reception data, and controls the notification processing to the user.

Furthermore, the calculation unit 150 may control notification contents of the notification processing in accordance with a magnitude relation between the detection light reception data and the reference data. When the notification processing to the user is performed by display, the calculation unit 150 may change display contents in accordance with the magnitude relation between the detection light reception data and the reference data.

Specifically, when the detection light reception data is larger than the reference data, the calculation unit 150 may display that the ranging sensor 2 fails. When the detection light reception data is smaller than the reference data, on the other hand, the calculation unit 150 may display that the ranging sensor 2 needs to be repaired. In this manner, by changing the display contents in accordance with the magnitude relation, information indicating the degree of the measurement deviation can be added to the detection result of the presence/absence of the measurement deviation, and presented to the user. For example, when the above-mentioned difference is equal to or larger than a predetermined range during the deviation detection, the notification processing to the user may be performed by a method other than the method for changing the notification contents, such as avoiding the operation of the ranging sensor 2 during the ranging by the ranging sensor 2.

The calculation unit 150 outputs the notification contents for the user selected by the above-mentioned difference to the output terminal 160, and performs the notification processing for the user through the output terminal 160.

The calculation unit 150 also has a function for correcting a measurement deviation in addition to the notification processing for the user based on the detection of the measurement deviation.

The output terminal 160 outputs the notification processing for the user to various kinds of devices under control of the calculation unit 150. Specifically, the output terminal 160 performs the notification processing for the user with a display device when the notification processing is display, and performs the notification processing with a voice output device when the notification processing is voice.

(2.1.3. Operation Flow for Deviation Detection)

Figure 6:
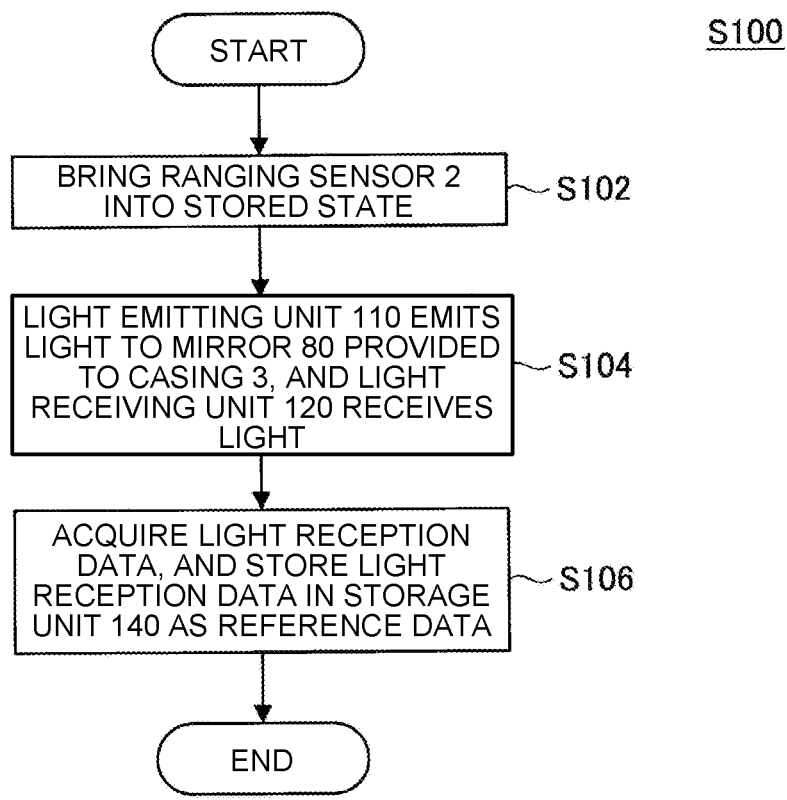
FIG. 6 is a flowchart illustrating an example of an operation flow of the detection sensor according to the first embodiment.
Figure 7:
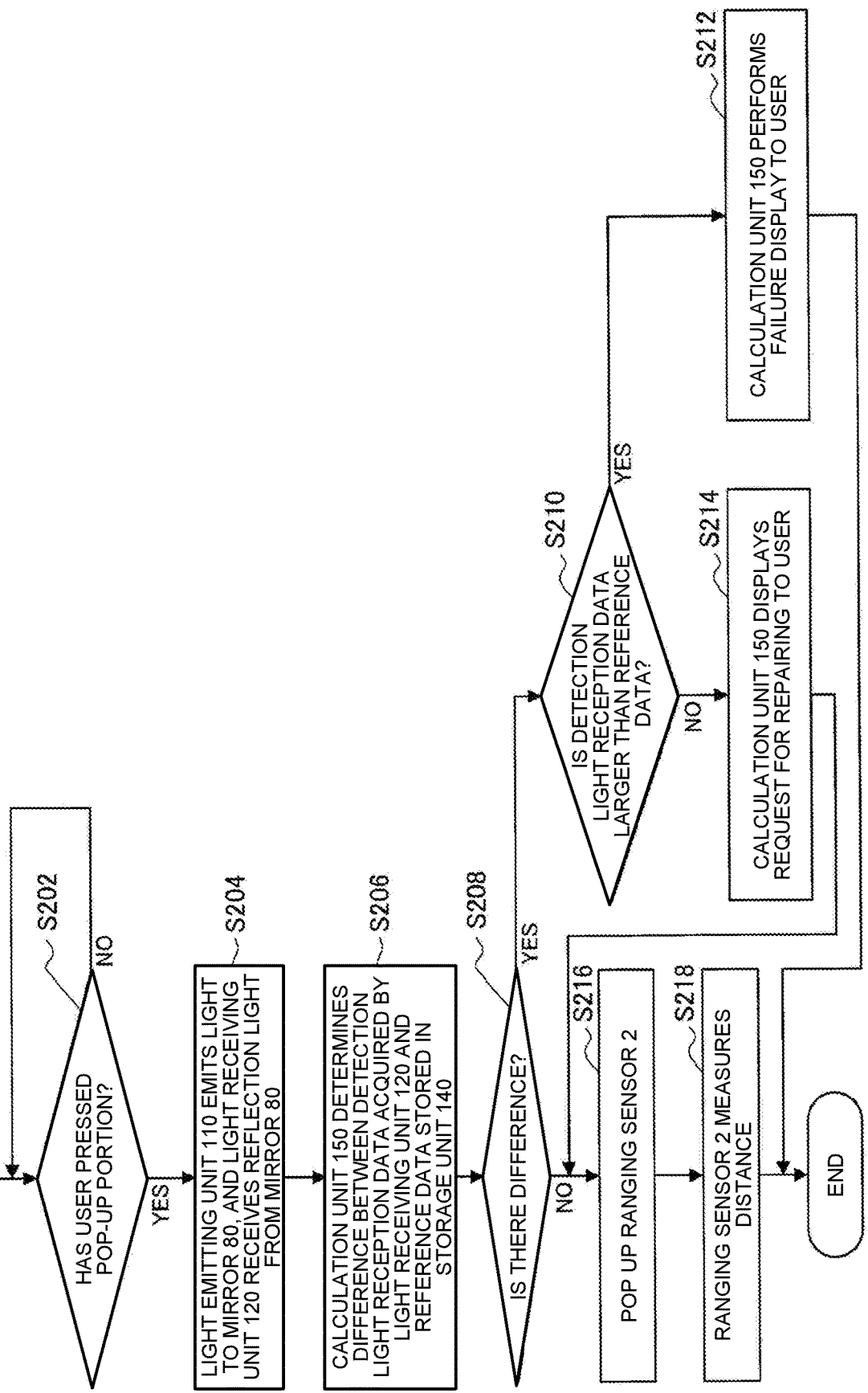
FIG. 7 is a flowchart illustrating an example of the operation flow of the detection sensor according to the first embodiment.

Operation flows of the configurations described above with reference to FIG. 5 are described with reference to FIG. 6 and FIG. 7. FIG. 6 illustrates an operation flow (S100) for acquiring reference data serving as a reference for detecting a measurement deviation. FIG. 7 illustrates an operation flow (S200) for detecting a measurement deviation by using the reference data.

Referring to FIG. 6, first, the ranging sensor 2 is brought into a state of being stored in the casing 3 (S102). The stored state refers to a state in which the ranging sensor 2 is buried in the casing 3.

Next, the light emitting unit 110 emits and applies light to the mirror 80 included in the casing 3, and the light receiving unit 120 receives light applied to and reflected by the mirror 80 (S104). In response to the reception of light, light reception data is generated in the light receiving unit 120.

Next, the light reception data obtained by the light receiving unit 120 is stored in the storage unit 140 as reference data (S106).

The operation flows for acquiring the reference data in the ranging sensor 2 have been described above. The operation for acquiring reference data may be performed before the product of the ranging sensor 2 is shipped, and the reference data may be stored in the ranging sensor 2 in advance. Alternatively, a user may acquire reference data as appropriate so that the reference data is stored. The ranging sensor 2 uses the thus acquired reference data to detect a measurement deviation.

Referring to FIG. 7, the detection of a measurement deviation by using reference data is described.

First, whether a user has pressed the pop-up type ranging sensor 2 is determined by the ranging sensor 2 (S202). When it is determined that the user has pressed the ranging sensor 2 (Yes at S202), the flow proceeds to the next processing. When it is determined that the user has not pressed the ranging sensor 2 (No at S202), on the other hand, whether the user has pressed the ranging sensor 2 is continuously determined.

In the pop-up type ranging sensor 2, when the user presses the ranging sensor 2 once, a pop-up mechanism operates so that the ranging sensor 2 can appear from the casing 3. Thus, when the ranging sensor 2 is pressed, the ranging sensor 2 is popped up to measure a distance, and hence by performing the measurement deviation detection operation inside the casing before the popup with the pressing timing as a trigger, the measurement deviation can be detected before the start of distance measurement.

Next, the light emitting unit 110 in the ranging sensor 2 applies light to the mirror 80, and the light receiving unit 120 receives reflection light from the mirror 80 (S204). The light receiving unit 120 generates detection light reception data.

Next, the calculation unit 150 compares the detection light reception data with reference data stored in the storage unit 140, and determines a difference (S206).

The calculation unit 150 determines whether the difference is present (S208). The calculation unit 150 may determine whether the difference is present by determining whether the difference falls within a predetermined range. When the difference is absent (No at S208), the ranging sensor 2 is popped up (S216). The popped-up ranging sensor 2 measures a distance (S218).

When the difference is present (Yes at S208), on the other hand, the calculation unit 150 next determines whether the detection light reception data is larger than the reference data (S210). When the detection light reception data is larger than the reference data (Yes at S210), the calculation unit 150 performs failure display to the user (S212).

After failure display is performed, the ranging sensor 2 is finished without any further operation. In this manner, when the detection light reception data is larger than the reference data, the amount of light emitted by the light emitting unit 110 may be large. By finishing the operation of the ranging sensor 2 depending on the magnitude relation between the detection light reception data and the reference data, the operation of the ranging sensor 2 whose emission amount may be large can be finished without causing the ranging sensor 2 to appear from the casing 3, and hence the safety can be further enhanced.

When the detection light reception data is smaller than the reference data (No at S210), on the other hand, the calculation unit 150 displays a request for repairing of the ranging sensor 2 to the user (S214).

After the request for repairing is displayed, the ranging sensor 2 is popped up (S216). In this manner, when the detection light reception data is smaller than the reference data, the light emission larger than a reference is not performed by the ranging sensor 2, and hence the user can continuously and safely measure a distance with the ranging sensor 2.

The pop-up type ranging sensor 2 detects a measurement deviation of the ranging sensor 2 and presents a detection result to the user through the above-mentioned operation flows.

In the first embodiment, the detection of a measurement deviation is started with the determination as to whether the pop-up type ranging sensor 2 has been pressed as a trigger. However, the measurement deviation may be regularly detected. For example, when the ranging sensor 2 is not popped up from the casing 3, the measurement deviation may be regularly detected.

(2.1.4. Calculation of Corrected Distance)

Figure 8:
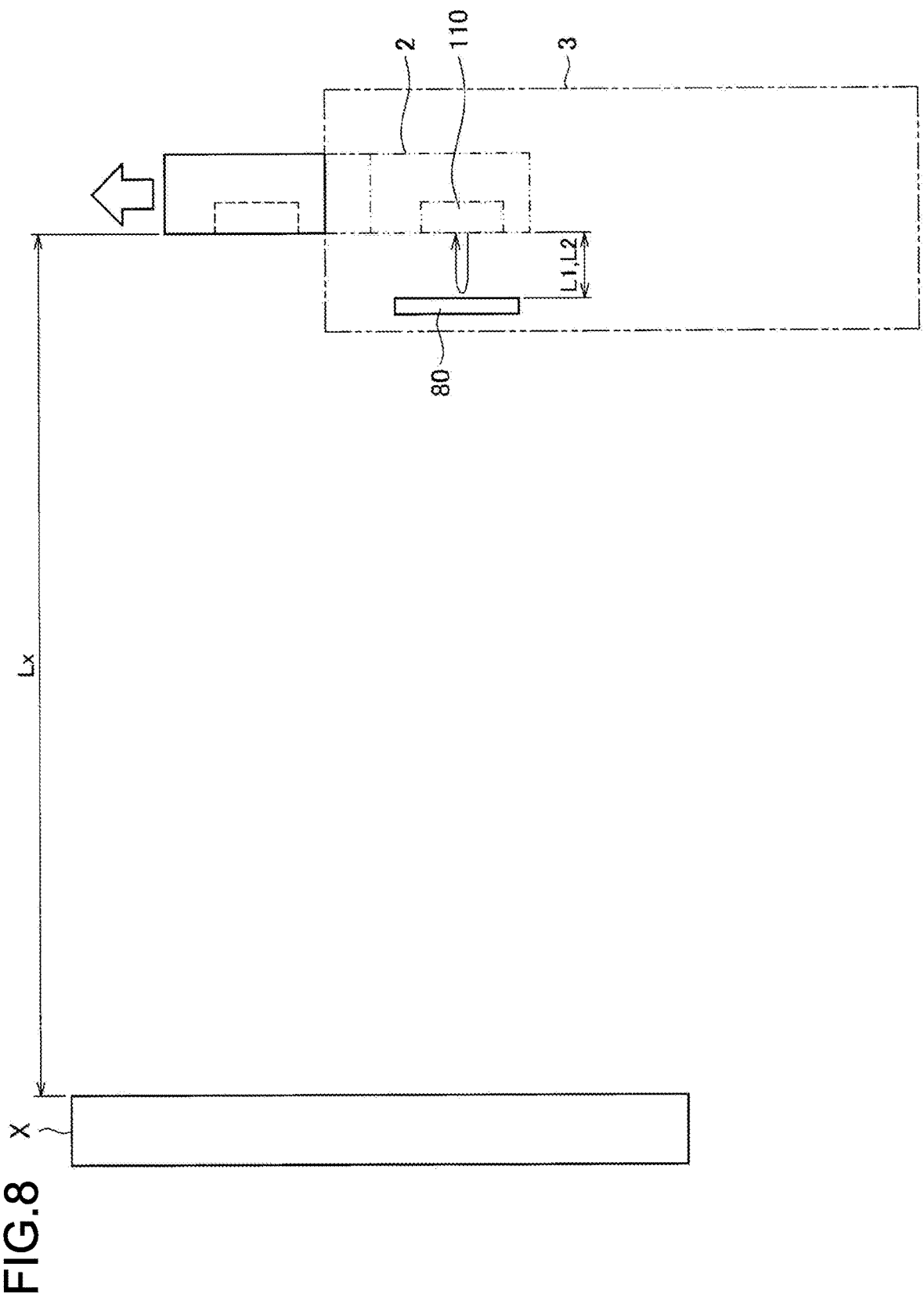
FIG. 8 is a schematic diagram illustrating a method for calculating a corrected distance by the detection sensor according to the first embodiment.
Figure 9:
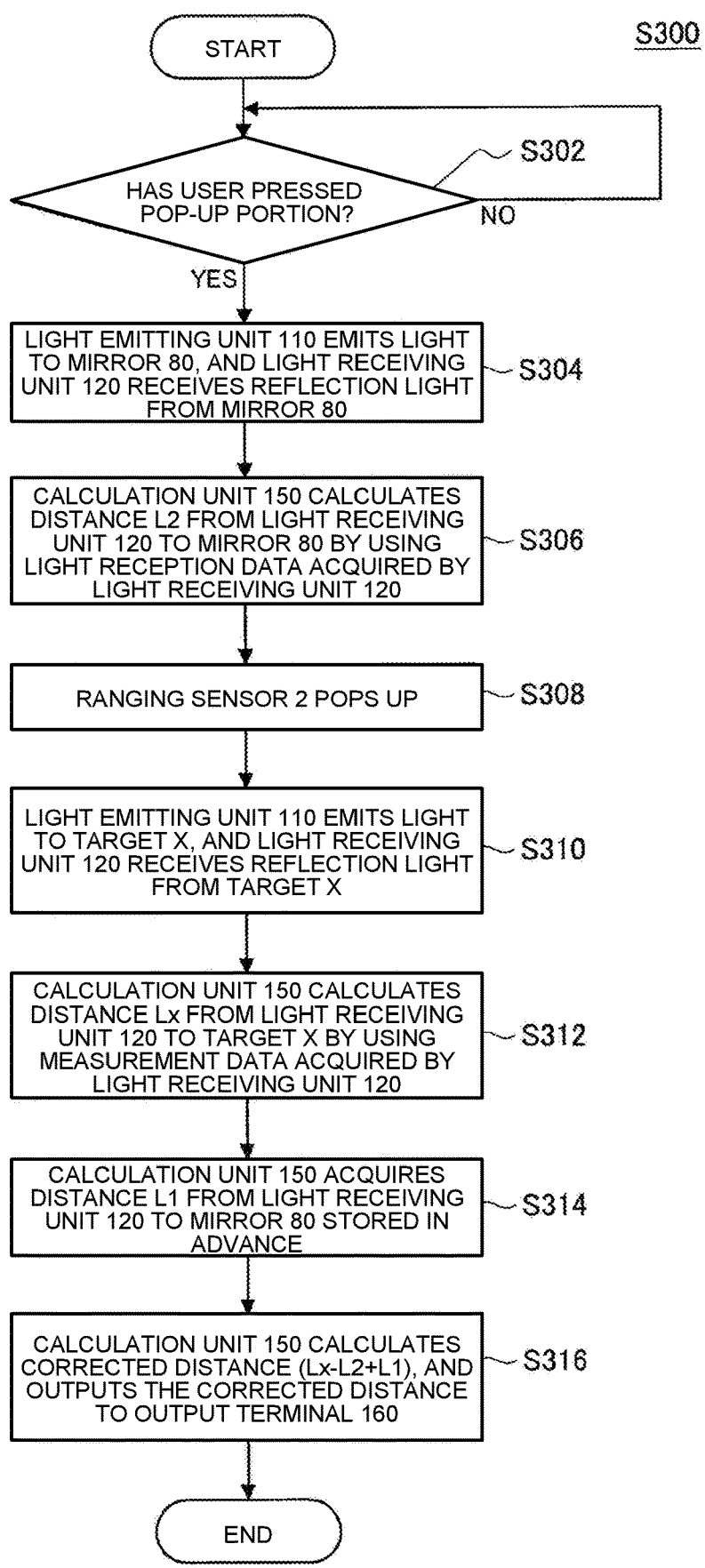
FIG. 9 is a flowchart illustrating an example of a flow for calculating a corrected distance by the detection sensor according to the first embodiment.

In addition to the notification processing to a user by the detection of a measurement deviation described above, the calculation unit 150 may calculate a corrected distance obtained by correcting a deviation of a measurement distance caused by the measurement deviation. Referring to FIG. 8 and FIG. 9, the calculation of a corrected distance is described. FIG. 8 is a schematic diagram illustrating how the corrected distance is calculated. FIG. 9 is a diagram illustrating a flow for calculating the corrected distance.

In FIG. 8, a casing 3 of an information processing terminal provided with a ranging sensor 2 is located at a position at a distance Lx from a target X. In the casing 3, the pop-up type ranging sensor 2 is provided, and a mirror 80 is provided at a position opposed to the ranging sensor 2 with a distance L1. A corrected distance is calculated in a manner that, similarly to the detection of a deviation by the light emitting unit 110 in the ranging sensor 2, the light emitting unit 110 applies light to the mirror 80, the light receiving unit 120 receives light reflected by the mirror 80 to acquire detection light reception data, and the detection light reception data and reference data are used.

Specifically, the calculation unit 150 calculates a corrected distance obtained by using the distance L1 from the reference object to the light receiving unit stored as reference data, the distance L2 from the reference object to the light receiving unit calculated from the detection light reception data, and the distance Lx from the ranging sensor 2 to the target. The distance L1 from the reference object to the light receiving unit is already stored in the storage unit 140 at the time of shipping similarly to the detection of the measurement deviation.

More specifically, the calculation unit 150 calculates a corrected distance (Lx−L2+L1). By subtracting the difference between L2 and L1 from the distance Lx, a deviation of the measurement distance caused by a deviation of synchronization timing of the light emitting unit 110 and the light receiving unit 120 can be corrected.

Referring to FIG. 9, the flow for calculating a corrected distance is described in detail.

First, the ranging sensor 2 determines whether a user has pressed the pop-up type ranging sensor 2 (S302).

Next, the light emitting unit 110 emits and applies light to the mirror 80, and the light receiving unit 120 receives reflection light from the mirror 80 (S304). Detection light reception data is generated.

Next, the calculation unit 150 uses the detection light reception data acquired by the light receiving unit 120 to calculate a distance L2 from the light receiving unit 120 to the mirror 80 (S306).

Next, the ranging sensor 2 is popped up (S308).

Next, the light emitting unit 110 emits and applies light to a target X, and the light receiving unit 120 receives reflection light from the target X (S310).

Next, the calculation unit 150 uses measurement data acquired by the light receiving unit 120 to calculate a distance Lx from the light receiving unit 120 to the target X (S312).

The calculation unit 150 acquires a distance L1 from the light receiving unit 120 to the mirror 80 stored in advance (S314).

The calculation unit 150 calculates a corrected distance (Lx−L2+L1) corrected by using the distance L1 from the light receiving unit 120 to the mirror 80 stored in advance, the measured distance Lx to the target, and the distance L2 from the light receiving unit 120 to the mirror 80 acquired before the ranging sensor 2 is popped up. The corrected distance calculated by the calculation unit 150 is output to the output terminal 160 (S316).

As described above, the ranging sensor 2 can correct a measurement distance and calculate a corrected distance to more accurately measure a distance.

(2.2. Cradle Type)

The pop-up type ranging sensor has been described above. The technology in the present disclosure is also applicable to other ranging sensors than the pop-up type ranging sensor. In this section, an example in which a ranging sensor is built in a casing of an information processing terminal and a measurement deviation of the ranging sensor is detected or corrected by a cradle type is described.

(2.2.1. Outer Appearance)

Figure 10:
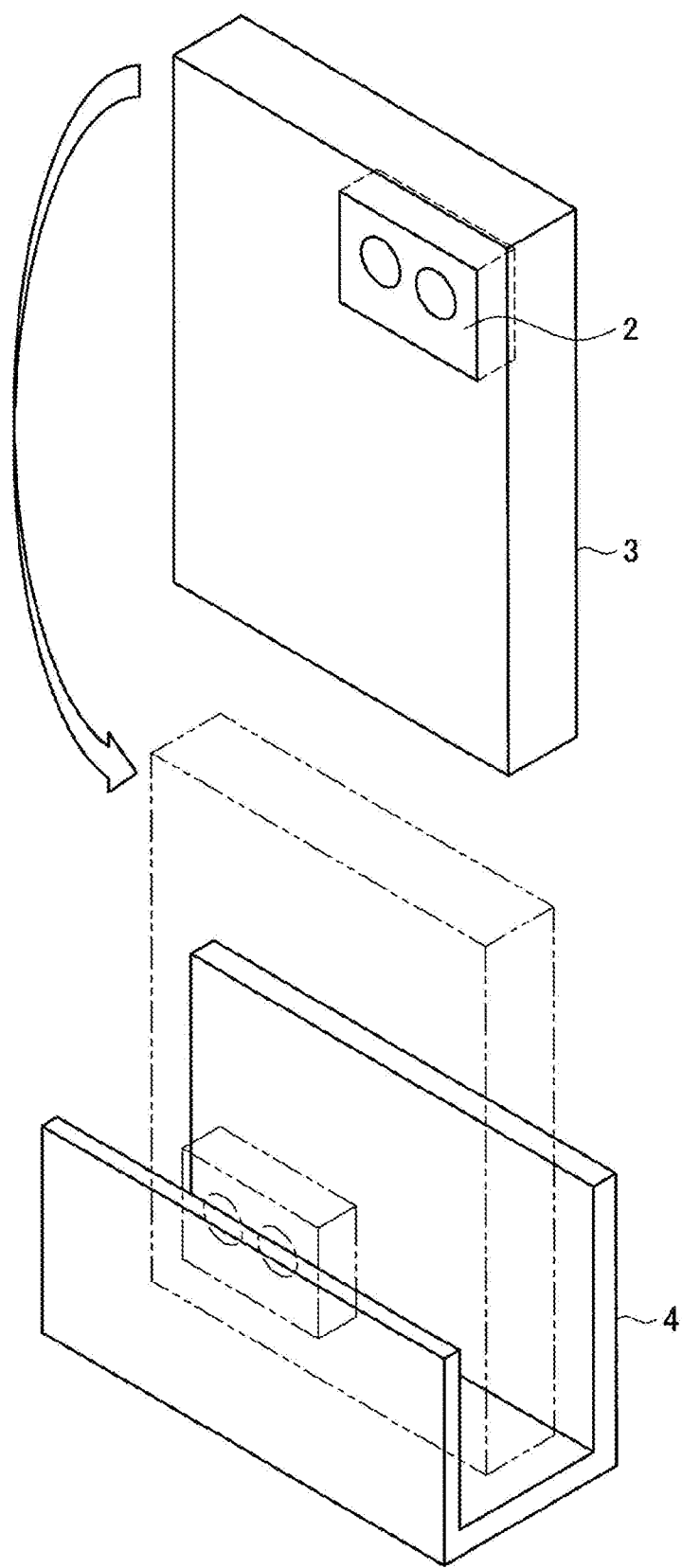
FIG. 10 is a diagram illustrating an example of a modification of the structure of the detection sensor according to the first embodiment.
Figure 11:
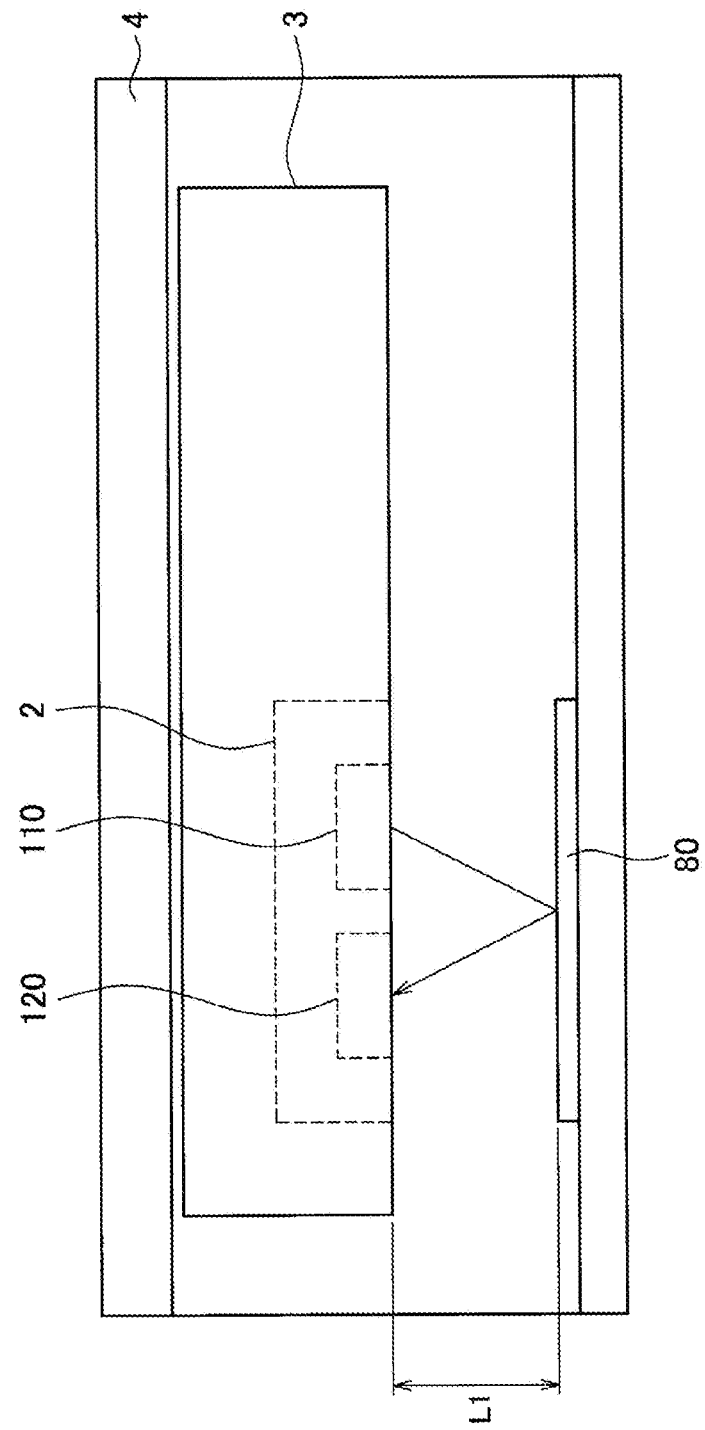
FIG. 11 is a diagram illustrating an example of a modification of the structure of the detection sensor according to the first embodiment.
Figure 12:
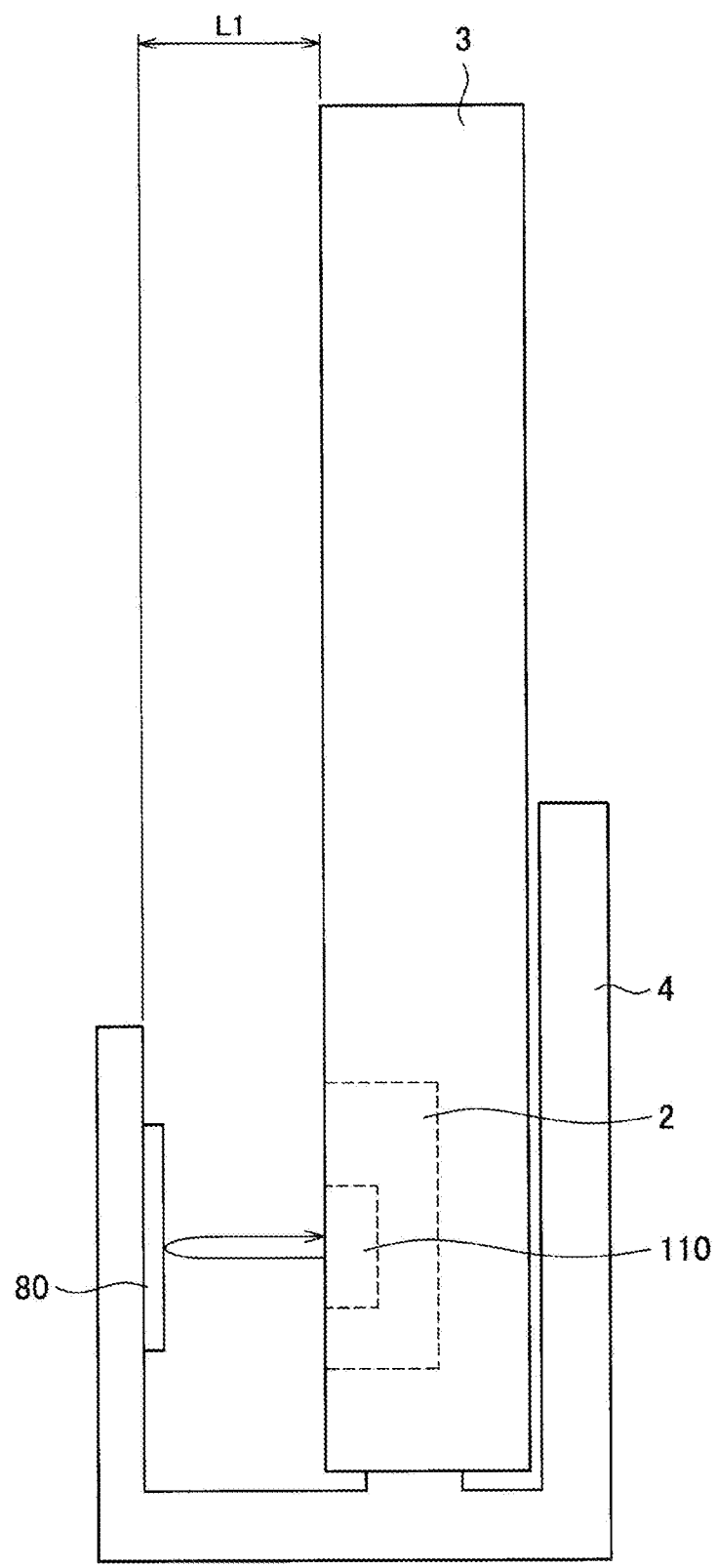
FIG. 12 is a diagram illustrating an example of a modification of the structure of the detection sensor according to the first embodiment.
Figure 13:
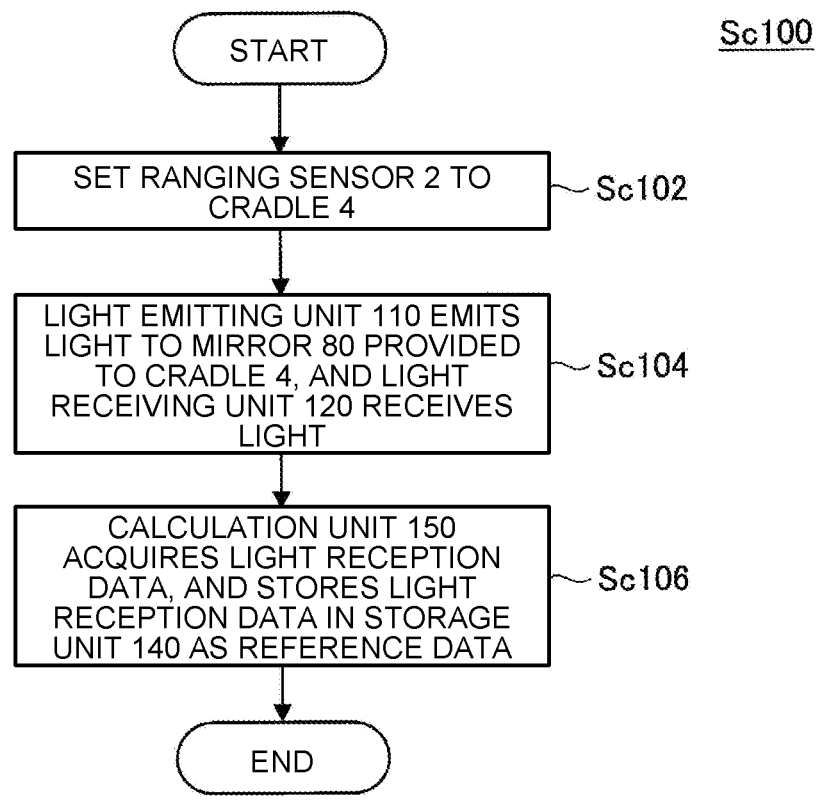
FIG. 13 is a flowchart illustrating an operation flow in the modification of the detection sensor according to the first embodiment.
Figure 14:
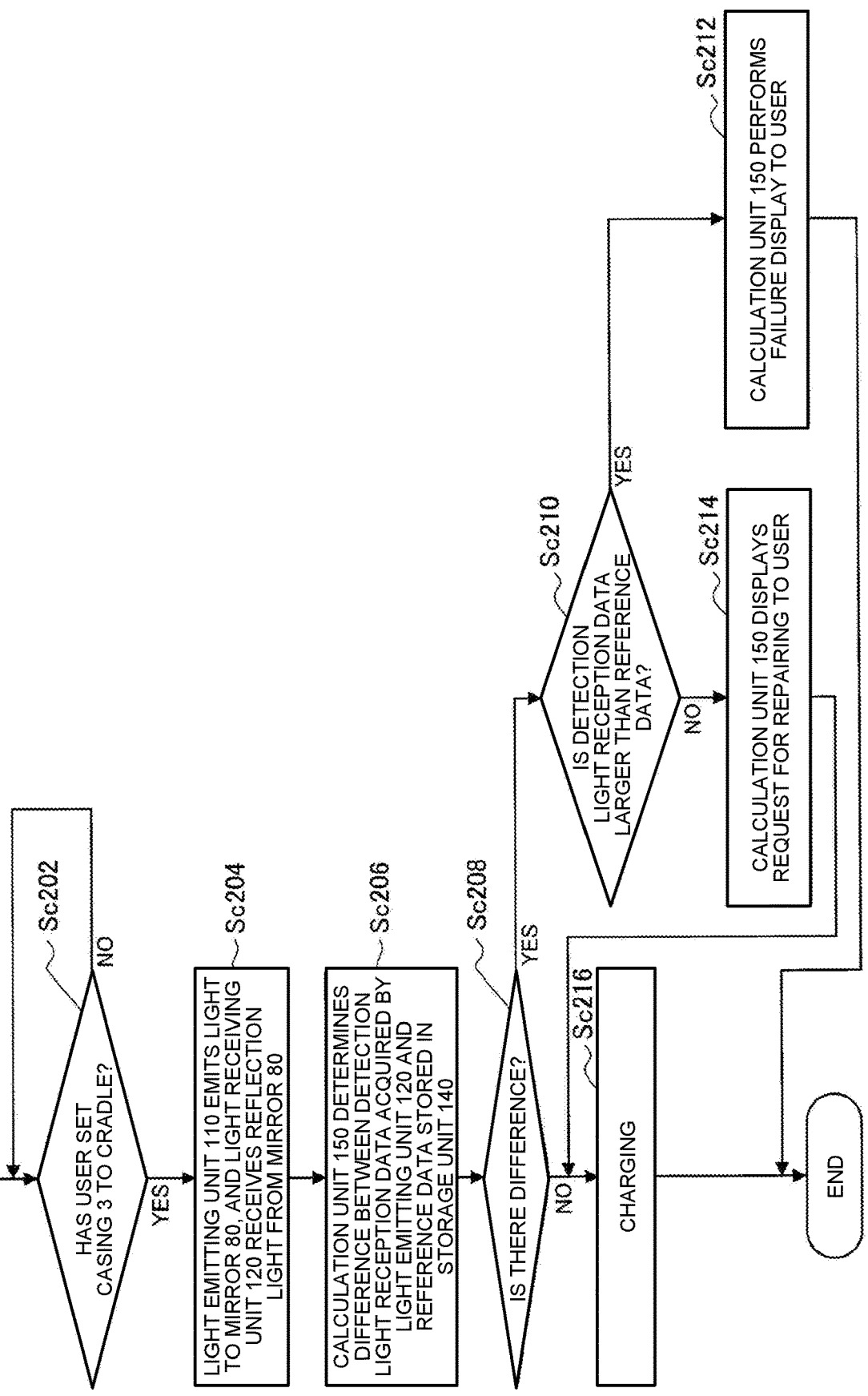
FIG. 14 is a flowchart illustrating an operation flow in the modification of the detection sensor according to the first embodiment.
Figure 15:
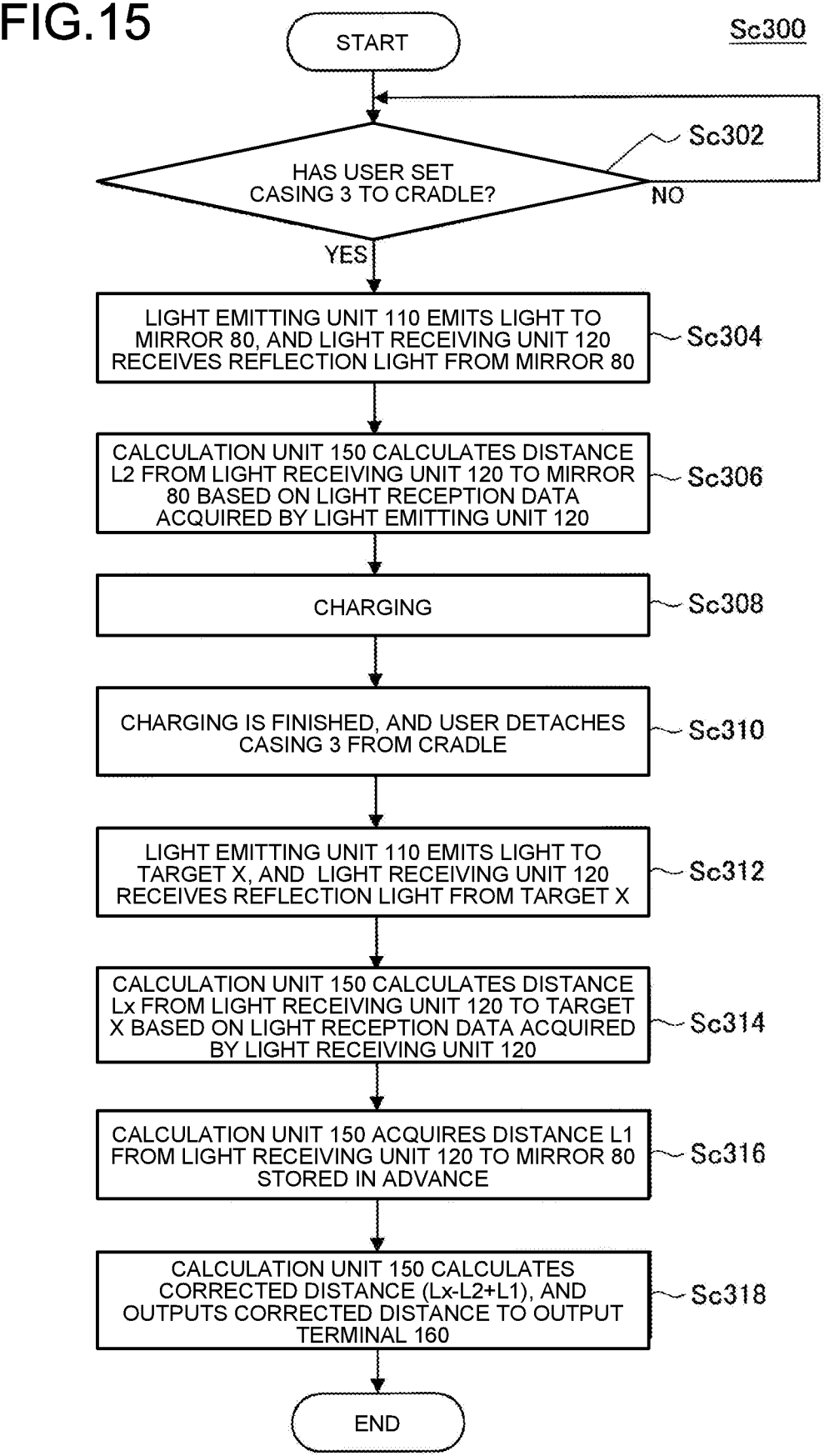
FIG. 15 is a flowchart illustrating an example of a flow for calculating a corrected distance in the modification of the detection sensor according to the first embodiment.

Referring to FIG. 10 to FIG. 15, an example of detection or correction of a measurement deviation of the cradle type ranging sensor is described. FIG. 10 is a diagram illustrating the outer appearance of a casing of an information processing terminal having the ranging sensor built therein and a cradle. FIG. 11 and FIG. 12 are diagrams illustrating how the casing is set to the cradle. FIG. 13 to FIG. 15 are diagrams illustrating a flow for detecting a measurement deviation or a flow for calculating a corrected distance in the cradle type ranging sensor.

Referring to FIG. 10, the ranging sensor 2 is provided inside the casing 3. A cradle 4 is attached to the casing 3. The cradle 4 is a device having functions for charging the casing 3 and transferring data when connected to the casing 3.

For detection of a measurement deviation of the ranging sensor 2, the mirror 80 serving as a reference object is provided in the casing 3 in the pop-up type ranging sensor 2, but the mirror 80 serving as a reference object may be provided to the cradle 4 in the cradle type.

Referring to FIG. 11 and FIG. 12, the mirror 80 is provided to a recess in the cradle 4 on one side surface on the casing 3 side. When the casing 3 is set to the cradle 4, the mirror 80 is provided at a position opposed to the ranging sensor 2 at a distance L1 from the ranging sensor 2. In the ranging sensor 2, the light emitting unit 110 applies light to the mirror 80, and the light receiving unit 120 receives light reflected by the mirror 80, thereby detecting measurement deviation.

(2.2.2. Operation Flow for Deviation Detection)

Various configurations and functions are the same as those of the pop-up type, and hence the descriptions thereof are omitted. Referring to FIG. 13 to FIG. 15, an operation flow (Sc100) for measurement deviation detection is described.

Referring to FIG. 13, first, the ranging sensor 2 is set to the cradle 4 (Sc102).

Next, the light emitting unit 110 emits and applies light to the mirror 80 included in the cradle 4, and the light receiving unit 120 receives reflection light reflected from the mirror 80 (Sc104).

Next, the calculation unit 150 acquires light reception data, and stores the light reception data in the storage unit 140 as reference data (Sc106).

The operation flow for acquiring reference data in the cradle type ranging sensor 2 has been described above. The operation for acquiring reference data may be performed before the product of the ranging sensor 2 is shipped, and the reference data may be stored in the ranging sensor 2 in advance. Alternatively, a user may acquire reference data as appropriate to generate reference data. The ranging sensor 2 uses the thus acquired reference data to detect a measurement deviation.

Next, a detection flow (Sc200) for a measurement deviation by using reference data is described with reference to FIG. 14.

First, the ranging sensor 2 determines whether a user has set the casing 3 to the cradle 4 (Sc202). When it is determined that the user has set the casing 3 to the cradle 4 (Yes at Sc202), the flow proceeds to the next processing. On the other hand, when it is determined that the user has not set the casing 3 to the cradle 4 (No at Sc202), whether the user has set the casing 3 to the cradle 4 is continuously determined.

Next, the light emitting unit 110 in the ranging sensor 2 applies light to the mirror 80, and the light receiving unit 120 receives reflection light from the mirror 80 (Sc204). The light receiving unit 120 generates detection light reception data.

Next, the calculation unit 150 compares the detection light reception data with the reference data stored in the storage unit 140, and determines a difference therebetween (Sc206).

The calculation unit 150 determines whether the difference is present (Sc208). The calculation unit 150 may determine whether the difference falls within a predetermined range to determine whether the difference is present. When the difference is absent (No at Sc208), the information processing terminal is charged and data is transferred through the cradle 4 (Sc216).

When the difference is present (Yes at Sc208), on the other hand, it is next determined whether the detection light reception data is larger than the reference data (Sc210). When the detection light reception data is larger than the reference data (Yes at Sc210), the calculation unit 150 performs failure display to the user (Sc212).

After the failure display is performed, the operation is finished without charging the information processing terminal through the cradle 4. In this manner, when the detection light reception data is larger than the reference data, the amount of light emitted by the light emitting unit 110 may be large. By avoiding the charging depending on the magnitude relation between the detection light reception data and the reference data, the ranging sensor 2 whose emission amount may be large can be early notified to the user to further enhance the safety.

When the detection light reception data is smaller than the reference data (No at Sc210), on the other hand, the calculation unit 150 displays a request for repairing of the ranging sensor 2 to the user (Sc214).

After the request for repairing is displayed, the casing 3 is charged through the cradle 4 (Sc216). In this manner, when the detection light reception data is smaller than the reference data, the light emission larger than a reference is not performed by the ranging sensor 2, and hence the safety of the user is secured, and the casing 3 is charged through the cradle 4, so as to be ready to the next ranging.

For the detection of the measurement deviation in the cradle type, the measurement deviation of the ranging sensor 2 is detected through the above-mentioned operation flows.
(2.2.3. Calculation of Corrected Distance)

Similarly to the pop-up type, the calculation unit 150 may calculate, in addition to the notification processing to the user by the detection of the measurement deviation, a corrected distance obtained by correcting a deviation of a measurement distance caused by the measurement deviation. Referring to FIG. 15, the calculation of the corrected distance is described. FIG. 15 is a diagram illustrating a calculation flow (Sc300) for a corrected distance. In the cradle type, the mirror 80 illustrated in FIG. 8 is provided in the cradle 4, and the ranging sensor 2 is built in the casing 3.

Referring to FIG. 15, the calculation flow for a corrected distance is described in detail.

First, the ranging sensor 2 determines whether the user has set the casing 3 to the cradle 4 (Sc302).

Next, the light emitting unit 110 emits and applies light to the mirror 80, and the light receiving unit 120 receives reflection light from the mirror 80 (Sc304).

Next, the calculation unit 150 calculates a distance L2 from the light receiving unit 120 to the mirror 80 based on the light reception data acquired by the light receiving unit 120 (Sc306).

Next, the information processing terminal is charged through the cradle 4 (Sc308).

Next, the user detaches the casing 3 from the cradle 4 (Sc310).

Next, the light emitting unit 110 emits and applies light to the target X, and the light receiving unit 120 receives reflection light from the target X (Sc312).

Next, the calculation unit 150 calculates a distance Lx from the light receiving unit 120 to the target X based on the light reception data acquired by the light receiving unit 120 (Sc314).

The calculation unit 150 acquires the distance L1 from the light receiving unit 120 to the mirror 80 stored in advance (Sc316).

The calculation unit 150 calculates a corrected distance (Lx−L2+L1) corrected by using the distance L1 from the light receiving unit 120 to the mirror 80 stored in advance, the measured distance Lx to the target, and the distance L2 from the light receiving unit 120 to the mirror 80 acquired before the ranging sensor 2 is popped up. The corrected distance calculated by the calculation unit 150 is output to the output terminal 160 (Sc318).

As described above, when the corrected distance is calculated by the cradle type, the above-mentioned method can be used to more accurately measure a distance.

3. Second Embodiment (Detection of Deviation of Light Emitting Unit)

In the first embodiment, the detection and correction of a measurement deviation of the ranging sensor 2 having the light emitting unit 110 and the light receiving unit 120 have been described. In a second embodiment as another embodiment, the case where a deviation of the light emitting unit 110 is detected is described with reference to FIG. 16 to FIG. 20. In the second embodiment, the detection of a deviation such as the emission amount of the light emitting unit 110 in the ranging sensor 2 is described as an example. The second embodiment is not limited to such an example, and is applicable to the detection of a deviation of a sensor including a light emitting unit.

(3.1. Pop-Up Type)
(3.1.1. Configuration and Functions)

Figure 16:
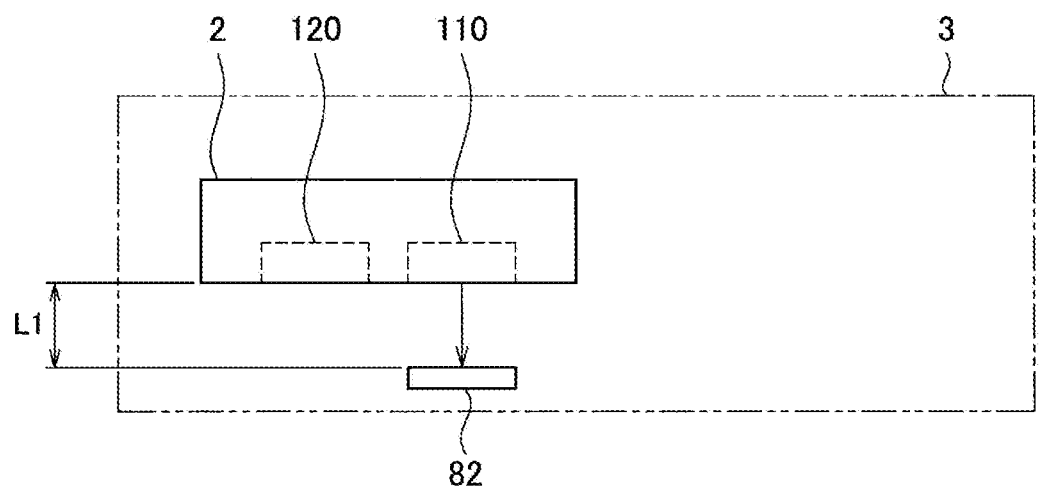
FIG. 16 is a diagram illustrating an example of a structure of a detection sensor according to a second embodiment of the present disclosure.
Figure 17:
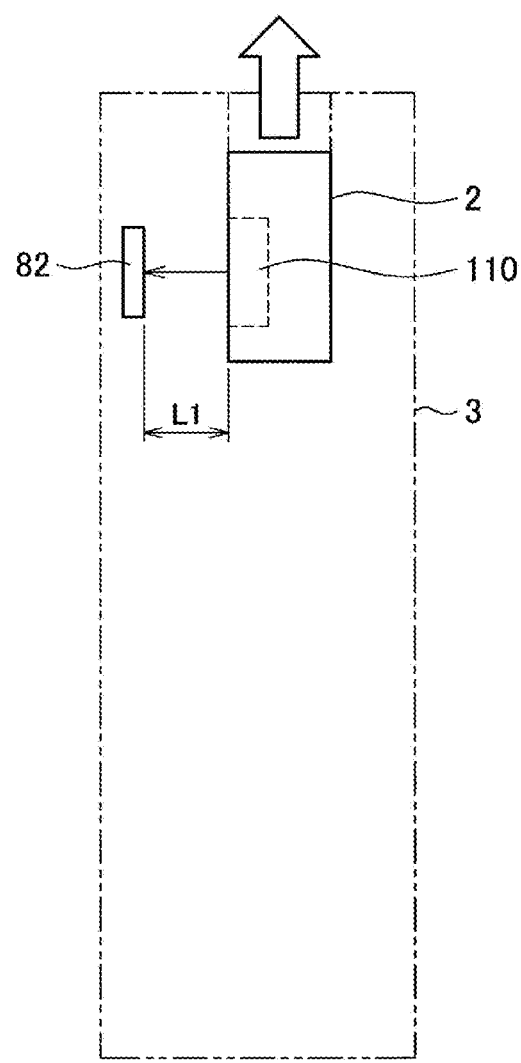
FIG. 17 is a diagram illustrating an example of the structure of the detection sensor according to the second embodiment.

Referring to FIG. 16 and FIG. 17, the internal configuration and functions of a casing of an information processing terminal provided with a pop-up type ranging sensor are described. FIG. 16 is a diagram of the casing 3 illustrated in FIG. 2 as seen from above one surface the inner side of which is provided with a ranging sensor including a mechanism configured to detect a deviation of the light emitting unit. FIG. 17 is a diagram of the casing 3 illustrated in FIG. 2 provided with the detection mechanism configured to detect a deviation of the light emitting unit as seen from the side. The configurations illustrated in FIG. 16 and FIG. 17 are different from those of the detection mechanism illustrated in FIG. 3 and FIG. 4 in that a PD 82 is provided instead of the mirror 80.

Referring to FIG. 16 and FIG. 17, the casing 3 is provided with the ranging sensor 2 having the light emitting unit 110 and the light receiving unit 120. In the casing 3, a photodiode PD 82 (hereinafter referred to as "PD 82") is provided to be opposed to the light emitting unit 110 with a distance L1. The PD 82 receives light applied from the light emitting unit 110, and acquires detection light reception data to detect a deviation of the light emitting unit 110.

Figure 18:
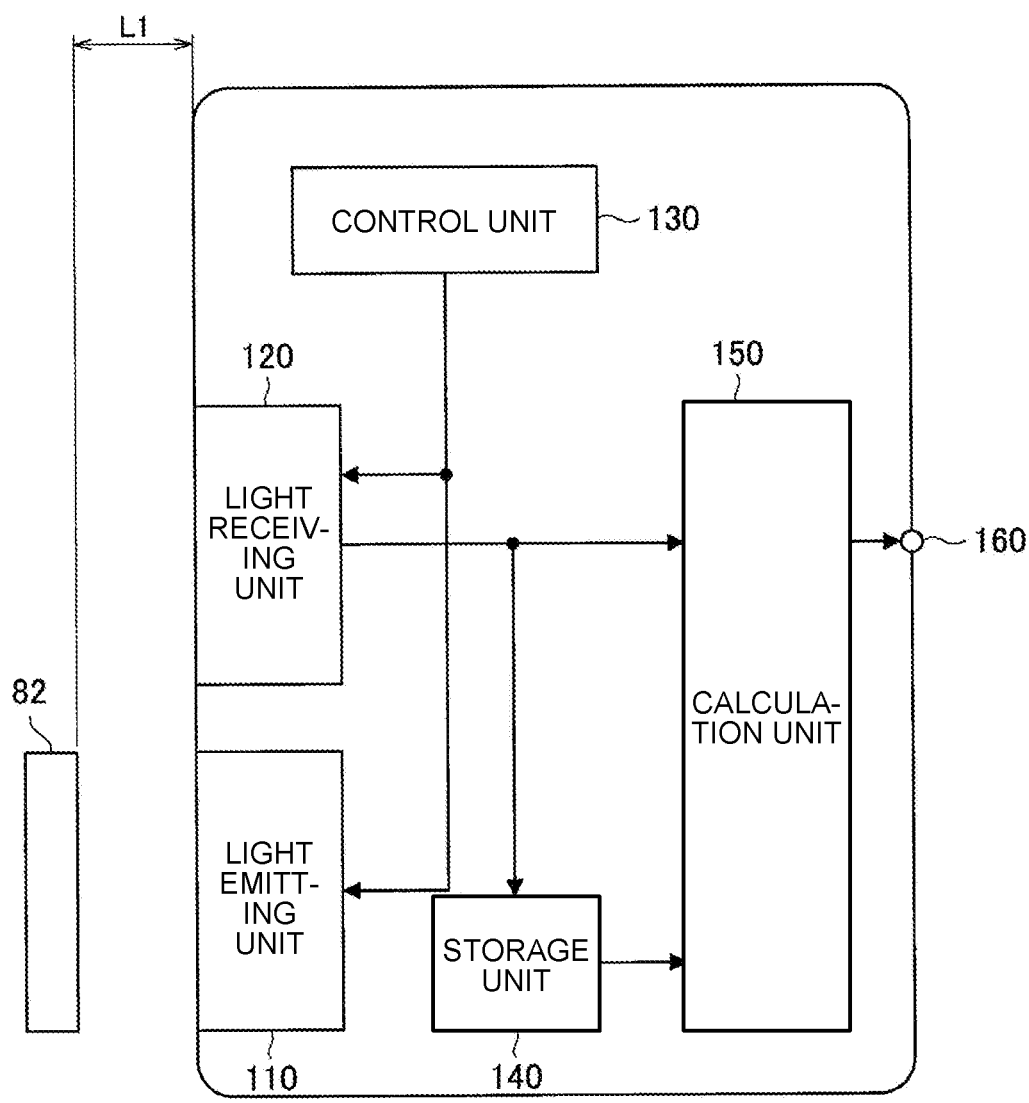
FIG. 18 is a block diagram illustrating an example of a mechanism of the detection sensor according to the second embodiment.

Referring to FIG. 18, various structures and functions in the casing 3 are described. FIG. 18 is a block diagram illustrating an example of a detection mechanism configured to detect a deviation of the light emitting unit 110. A detection mechanism 100 for a deviation of the light emitting unit 110 includes the PD 82 provided to be opposed to the light emitting unit 110. The detection mechanism 100 illustrated in FIG. 18 is different from the detection mechanism 100 illustrated in FIG. 5 in that the PD 82 is provided instead of the mirror 80.

The PD 82 has a function for receiving light to generate light reception data. The PD 82 is not limited to a photodiode as long as the amount of light emitted by the light emitting unit 110 can be received. For example, the PD 82 may be a photoresistor, a CCD, or a photomultiplier tube. The PD 82 generates light reception data in response to the reception of light, and outputs the light reception data to the calculation unit 150.

(3.1.2. Operation Flow for Deviation Detection)

Figure 19:
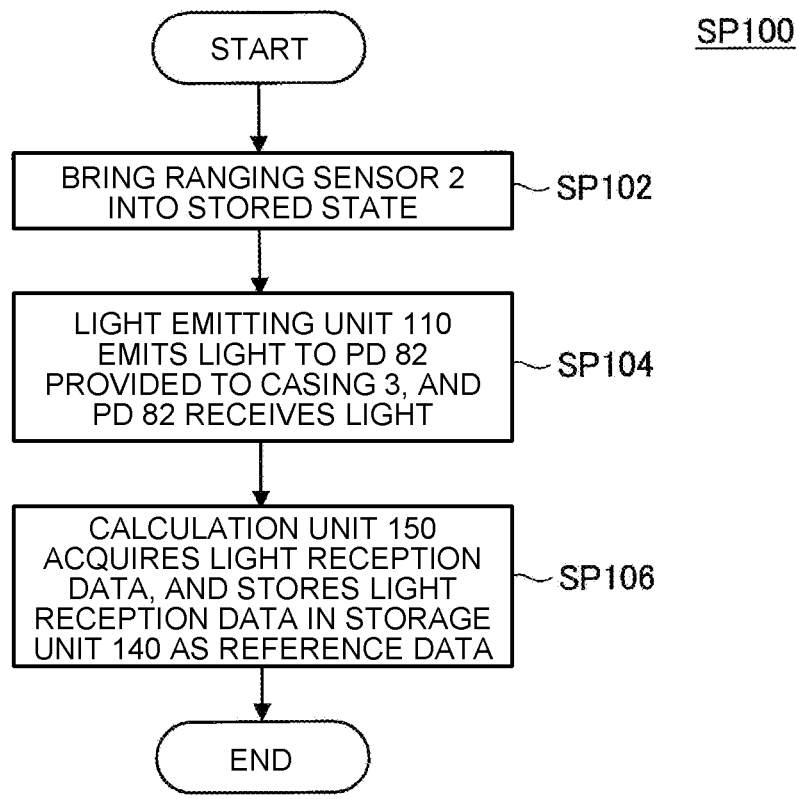
FIG. 19 is a flowchart illustrating an example of an operation flow of the detection sensor according to the second embodiment.
Figure 20:
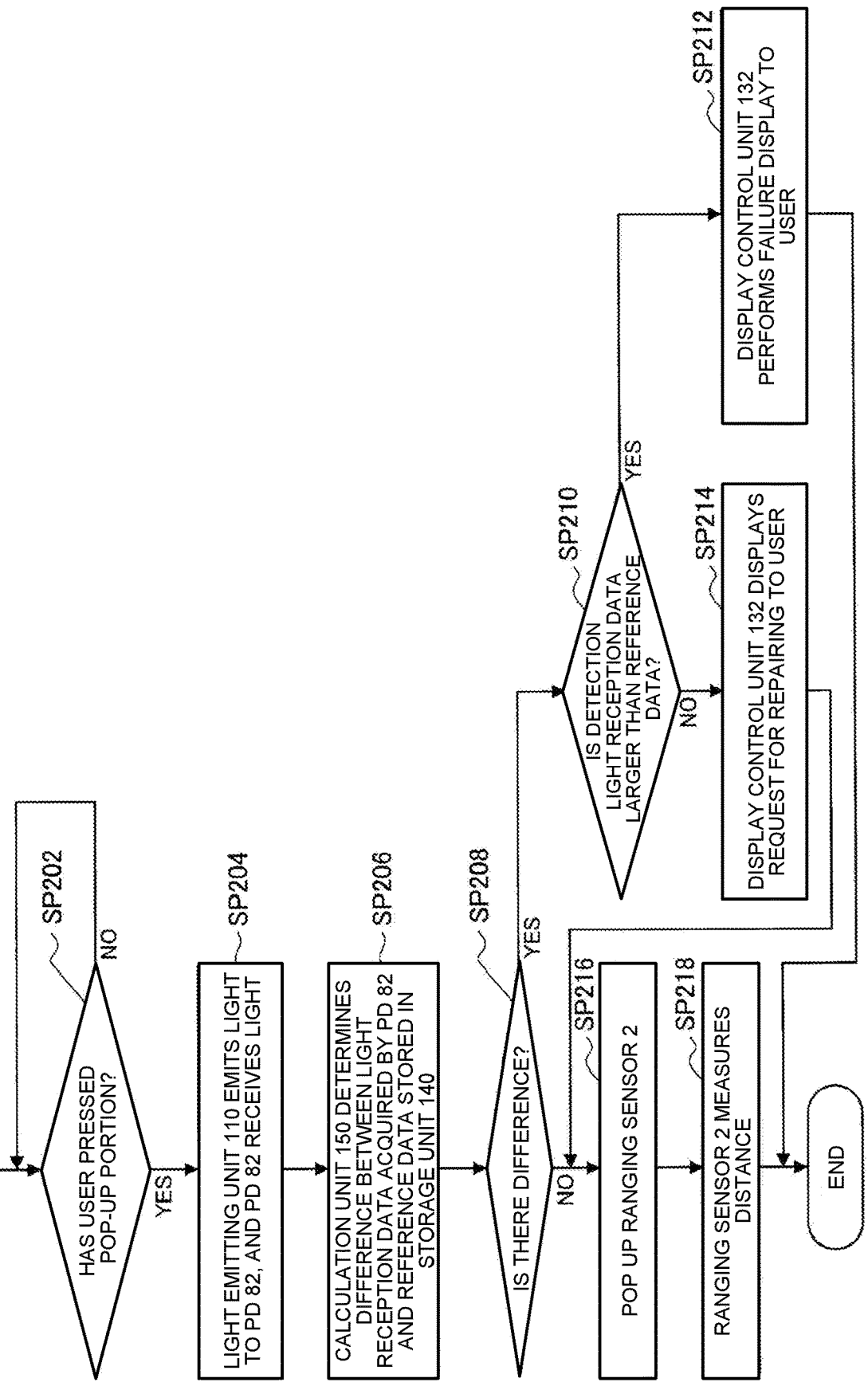
FIG. 20 is a flowchart illustrating an example of the operation flow of the detection sensor according to the second embodiment.

Operation flows of the configurations described above with reference to FIG. 18 are described with reference to FIG. 19 and FIG. 20. FIG. 19 illustrates an operation flow (SP100) for acquiring reference data serving as a reference for detecting deviation of the light emitting unit 110. FIG. 20 illustrates an operation flow (SP200) for detecting deviation of the light emitting unit 110 by using the reference data.

Referring to FIG. 19, first, the ranging sensor 2 is brought into a state of being stored in the casing 3 (SP102). The stored state refers to a state in which the ranging sensor 2 is buried in the casing 3.

Next, the light emitting unit 110 emits and applies light to the PD 82 included in the casing 3, and the PD 82 receives the light (SP104). In response to the reception of light, the PD 82 generates light reception data.

Next, the calculation unit 150 acquires the light reception data obtained by the PD 82, and stores the light reception data in the storage unit 140 as reference data (SP106).

The operation flows for acquiring the reference data by the PD 82 have been described above. The operation for acquiring reference data may be performed before the product of the ranging sensor 2 is shipped, and the reference data may be stored in the ranging sensor 2 in advance. Alternatively, a user may acquire reference data as appropriate to generate the reference data. The ranging sensor 2 uses the thus acquired reference data to detect a deviation of the light emitting unit 110.

Referring to FIG. 20, the detection of a deviation of the light emitting unit 110 by using reference data is described.

First, the ranging sensor 2 determines whether a user has pressed the pop-up type ranging sensor 2 (SP202). When it is determined that the user has pressed the ranging sensor 2 (Yes at SP202), the flow proceeds to the next processing. On the other hand, when it is determined that the user has not pressed the ranging sensor 2 (No at SP202), whether the ranging sensor 2 has been pressed is continuously determined.

In the pop-up type ranging sensor 2, when the user presses the ranging sensor 2 once, the popup mechanism operates so that the ranging sensor 2 may appear from the casing 3. Thus, when pressed, the ranging sensor 2 is popped up to measure a distance, and hence by determining the press timing and performing the operation for detecting a measurement deviation before the popup, the measurement deviation can be detected before the start of ranging.

Next, the light emitting unit 110 in the ranging sensor 2 applies light to the PD 82, and the PD 82 receives the light (SP204). The PD 82 generates detection light reception data.

Next, the calculation unit 150 compares the detection light reception data acquired by the PD 82 with reference data stored in the storage unit 140, and determines a difference therebetween (SP206). For example, the difference indicates the difference in emission amount.

Next, the calculation unit 150 determines whether the difference is present (SP208). The calculation unit 150 determines whether the difference falls within a predetermined range to determine whether the difference is present. When the difference is absent (No at SP208), the ranging sensor 2 is popped up (SP216). The popped-up ranging sensor 2 measures a distance (SP218).

When the difference is present (Yes at SP208), on the other hand, the calculation unit 150 next determines whether the detection light reception data is larger than the reference data (SP210). When the detection light reception data is larger than the reference data (Yes at SP210), the calculation unit 150 performs failure display to the user (SP212).

After the failure display is performed, the ranging sensor 2 is finished without any further operation. In this manner, when the detection light reception data is larger than the reference data, the amount of light emitted by the light emitting unit 110 may be large. By finishing the operation of the ranging sensor 2 depending on the magnitude relation between the detection light reception data and the reference data, the ranging sensor 2 whose emission amount may be large can be finished without appearing from the casing 3, and the safety can be further enhanced.

When the detection light reception data is smaller than the reference data (No at SP210), on the other hand, the calculation unit 150 displays a request for repairing of the ranging sensor 2 to the user (SP214).

After the request for repairing is displayed, the ranging sensor 2 is popped up (SP216). In this manner, when the detection light reception data is smaller than the reference data, the light emission larger than a reference is not performed by the ranging sensor 2, and hence the user can continuously and safely measure a distance with the ranging sensor 2.

The pop-up type ranging sensor 2 detects a deviation of the light emitting unit 110 in the ranging sensor 2 through the above-mentioned operation flows.

(3.2. Cradle Type)

(3.2.1. Configuration)

Figure 21:
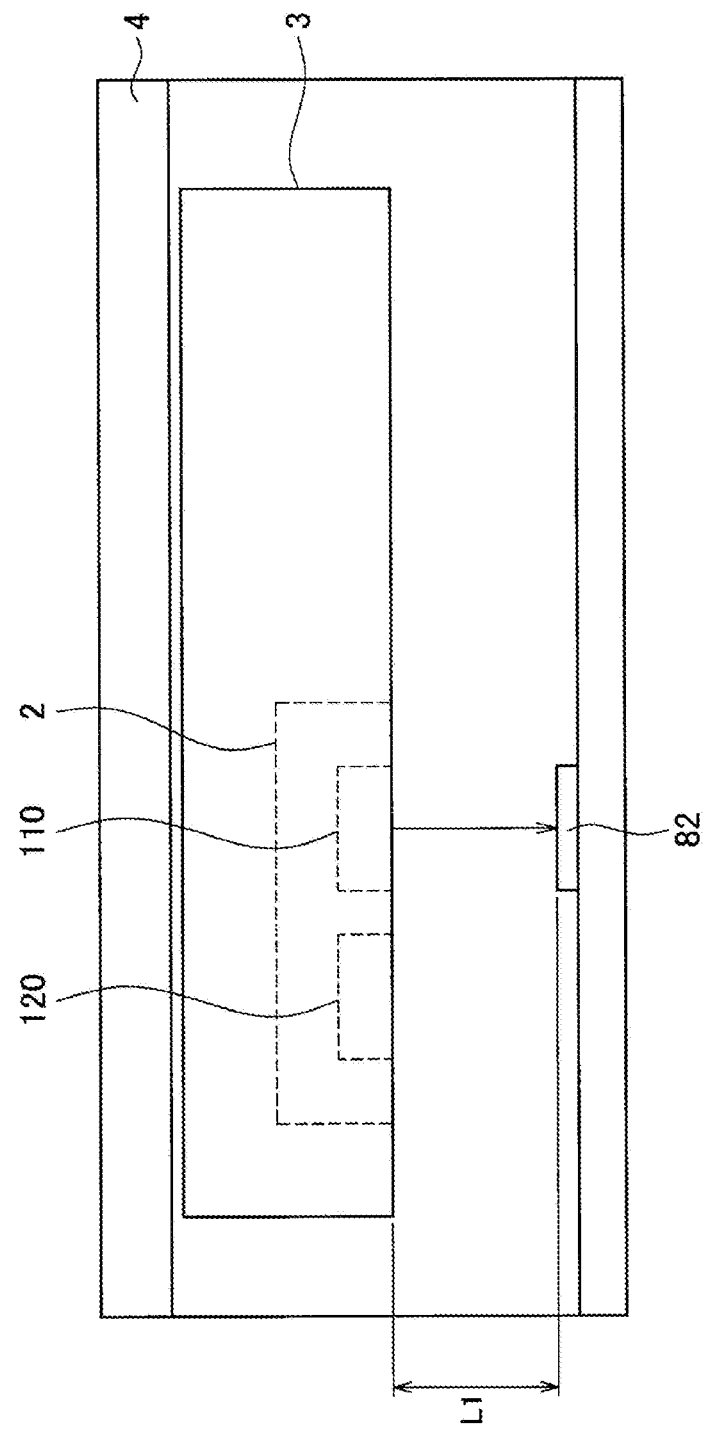
FIG. 21 is a diagram illustrating an example of a modification of the structure of the detection sensor according to the second embodiment.
Figure 22:
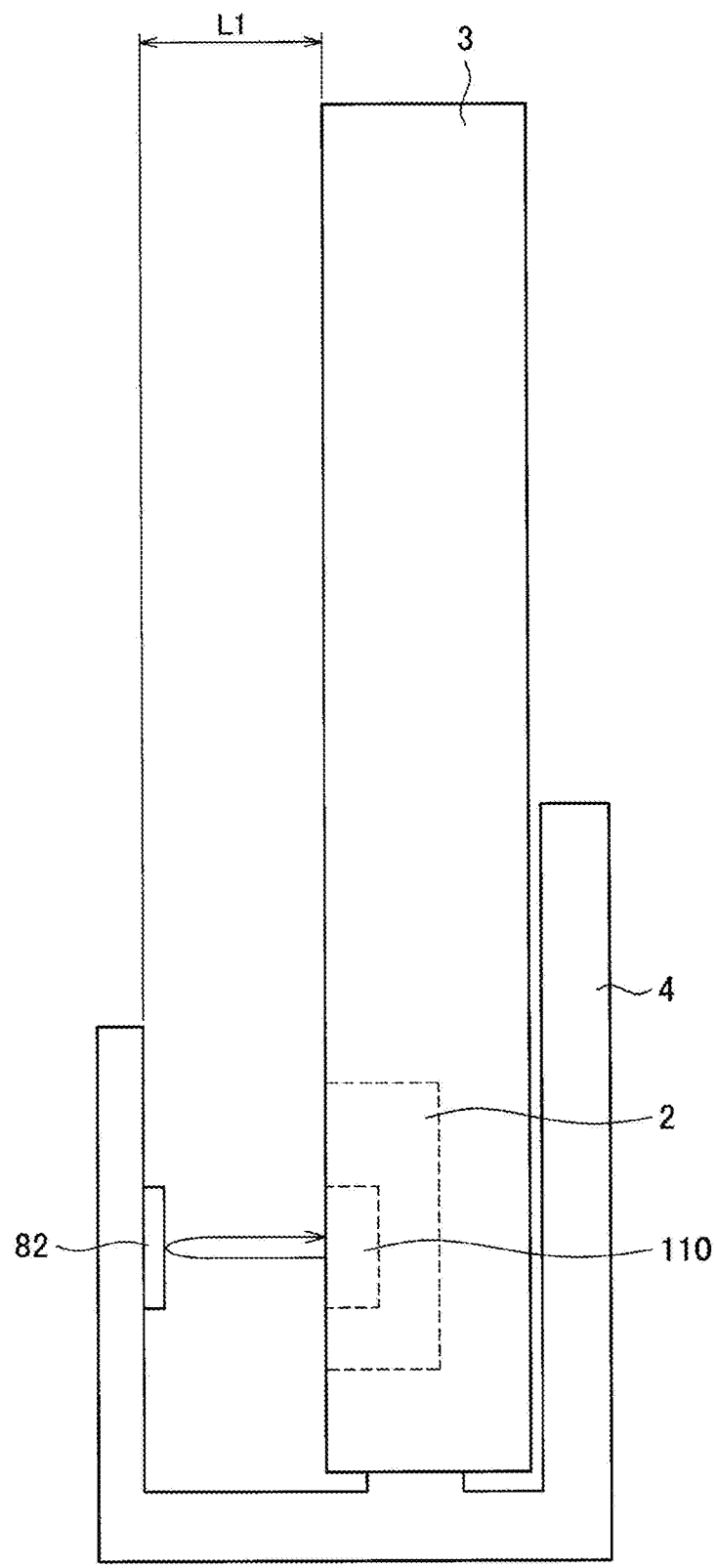
FIG. 22 is a diagram illustrating an example of a modification of the structure of the detection sensor according to the second embodiment.
Figure 23:
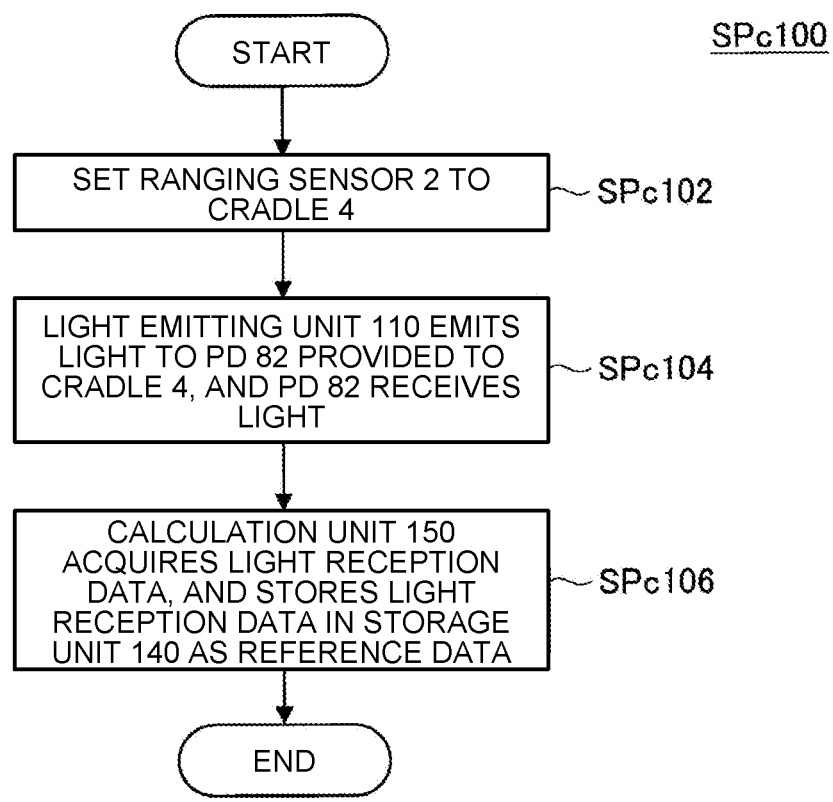
FIG. 23 is a flowchart illustrating an operation flow in the modification of the detection sensor according to the second embodiment.
Figure 24:
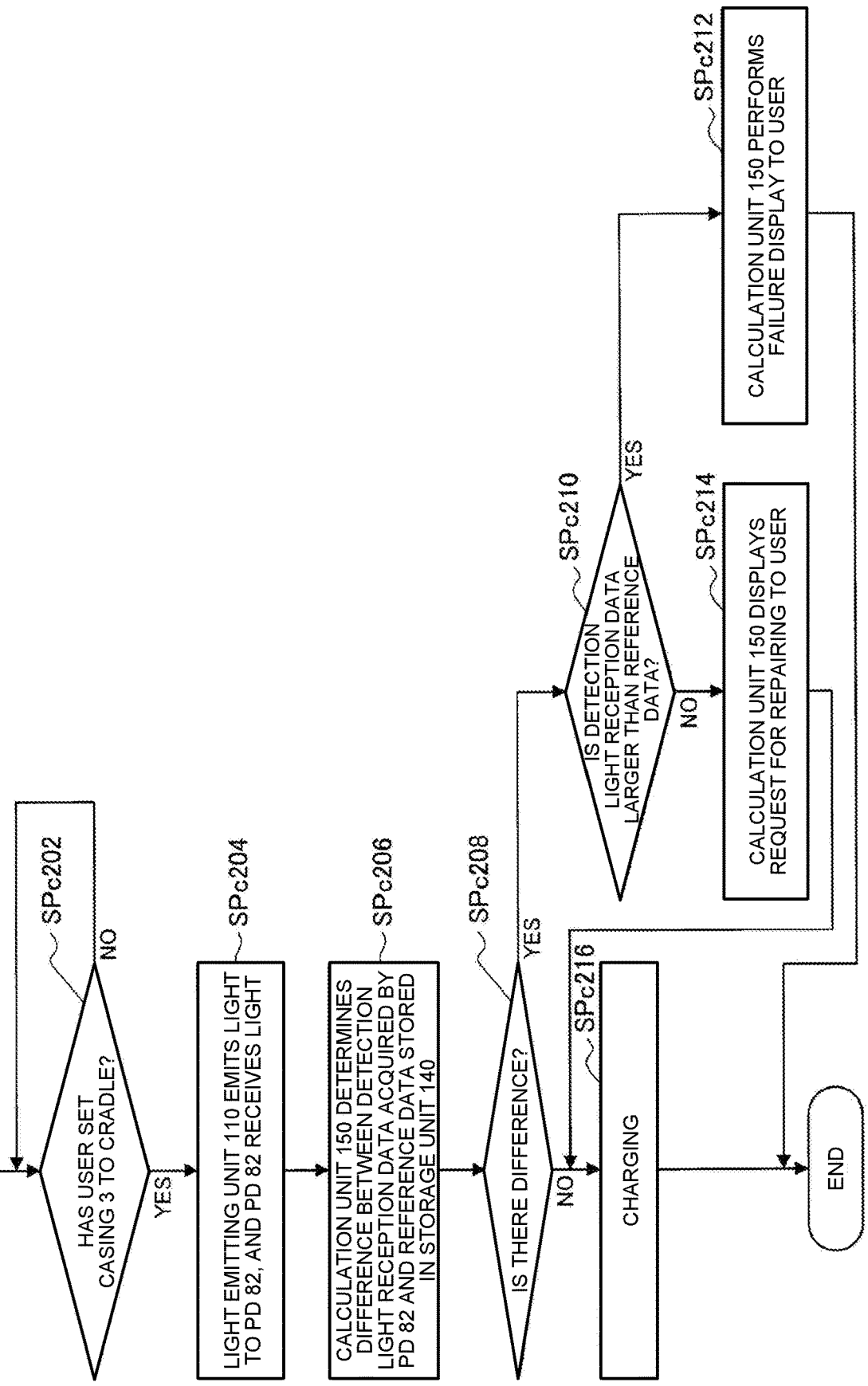
FIG. 24 is a flowchart illustrating an operation flow in the modification of the detection sensor according to the second embodiment.

Referring to FIG. 21 to FIG. 24, an example in which a measurement deviation of a light emitting unit 110 in a cradle type is detected is described. FIG. 21 and FIG. 22 are diagrams illustrating how a casing of an information processing terminal is set to a cradle. FIG. 23 and FIG. 24 are diagrams illustrating operation flows for detecting a deviation of the light emitting unit by a cradle type.

Referring to FIG. 21 and FIG. 22, a PD 82 is provided on one side surface of a recess in the cradle 4 on the casing 3 side. When the casing 3 is set to the cradle 4, the PD 82 is provided at a position opposed to the ranging sensor 2 at a distance L1 from the ranging sensor 2. In the ranging sensor 2, the light emitting unit 110 applies light to the PD 82, and the PD 82 receives light to detect a deviation of the light emitting unit.

(3.2.2. Operation Flow for Deviation Detection)

Referring to FIG. 23 and FIG. 24, an operation flow (SPc100) for detecting a deviation of the light emitting unit is described.

Referring to FIG. 23, first, the ranging sensor 2 is set to the cradle 4 (SPc102).

Next, the light emitting unit 110 emits and applies light to the PD 82 included in the cradle 4, and the PD 82 receives the light (SPc104).

Next, the calculation unit 150 acquires light reception data, and stores the light reception data in the storage unit 140 as reference data (SPc106).

The operation flows for acquiring the reference data by the cradle type in the ranging sensor 2 have been described above. The operation for acquiring reference data may be performed before the product of the ranging sensor 2 is shipped, and the reference data may be stored in the ranging sensor 2 in advance. Alternatively, a user may acquire reference data as appropriate to generate the reference data. The ranging sensor 2 uses the thus acquired reference data to detect a deviation of the light emitting unit.

Next, a detection flow (SPc200) for a deviation of the light emitting unit by using reference data is described with reference to FIG. 24.

First, the ranging sensor 2 determines whether a user has set the casing 3 to the cradle 4 (SPc202). When it is determined that the user has set the casing 3 to the cradle 4 (Yes at SPc202), the flow proceeds to the next processing. When it is determined that the user has not set the casing 3 to the cradle 4 (No at SPc202), on the other hand, whether the user has set the casing 3 to the cradle 4 is continuously determined.

Next, the light emitting unit 110 in the ranging sensor 2 applies light to the PD 82, and the PD 82 receives the light (SPc204). The PD 82 generates detection light reception data.

Next, the calculation unit 150 compares the detection light reception data acquired by the PD 82 with reference data stored in the storage unit 140, and determines a difference therebetween (SPc206).

The calculation unit 150 determines whether the difference is present (SPc208). The calculation unit 150 may determine whether there is a difference by determining whether the difference falls within a predetermined range. When the difference is absent (No at SPc208), the information processing terminal is charged through the cradle 4 (SPc216).

When the difference is present (Yes at SPc208), on the other hand, the calculation unit 150 next determines whether the detection light reception data is larger than the reference data (SPc210). When the detection light reception data is larger than the reference data (Yes at SPc210), the calculation unit 150 performs failure display to the user (SPc212).

After the failure display is performed, the operation is finished without charging the casing 3 through the cradle 4. In this manner, when the detection light reception data is larger than the reference data, the amount of light emitted by the light emitting unit 110 may be large. By avoiding the charging depending on the magnitude relation between the detection light reception data and the reference data, the ranging sensor 2 whose emission amount may be large is early notified to the user, so that the safety can be further enhanced.

When the detection light reception data is smaller than the reference data (No at SPc210), on the other hand, the calculation unit 150 displays a request for repairing of the ranging sensor 2 to the user (SPc214).

After the request for repairing is displayed, the information processing terminal is charged through the cradle 4 (SPc216). In this manner, when the detection light reception data is smaller than the reference data, the light emission larger than a reference is not performed by the ranging sensor 2, and hence the safety of the user is secured, and the casing 3 is charged through the cradle 4 so as to be ready for the next ranging.

For detection of a deviation of the light emitting unit in the cradle type, the deviation of the light emitting unit is detected through the above-mentioned operation flows.

4. Third Embodiment (Detection of Deviation of Light Receiving Unit)

(4.1. Deviation Detection)

The technology in the present disclosure is not limited to a ranging sensor, and is applicable to a device having a light receiving unit configured to receive light from the outside. In a third embodiment, the case where a deviation of the light receiving unit 120 is detected is described with reference to FIG. 25 to FIG. 33. In the third embodiment, whether a deviation has occurred in the received light amount due to aged deterioration of the light receiving unit 120 can be detected and presented to the user.

(4.1.1. POP-UP TYPE)

(4.1.1.1. Configuration and Function)

Figure 25:
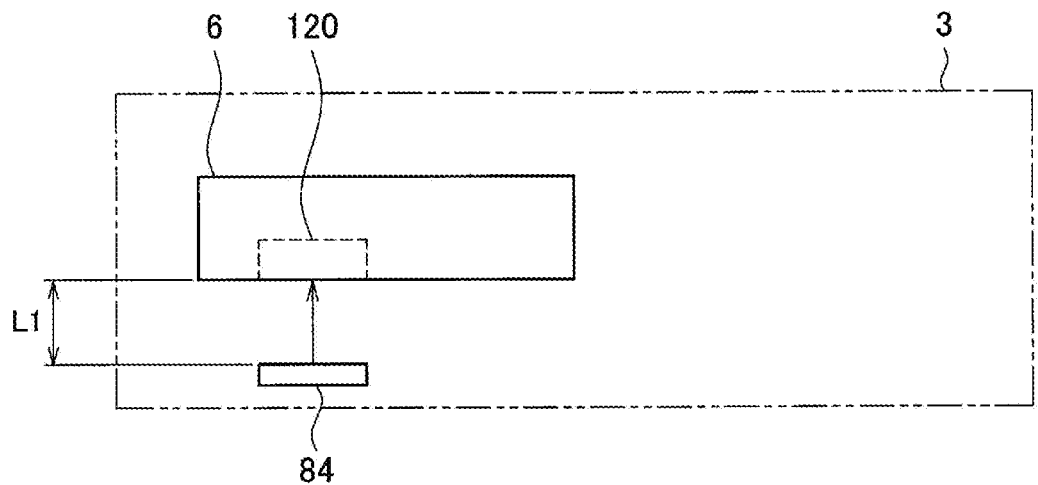
FIG. 25 is a diagram illustrating an example of a structure of a detection sensor according to a third embodiment of the present disclosure.
Figure 26:
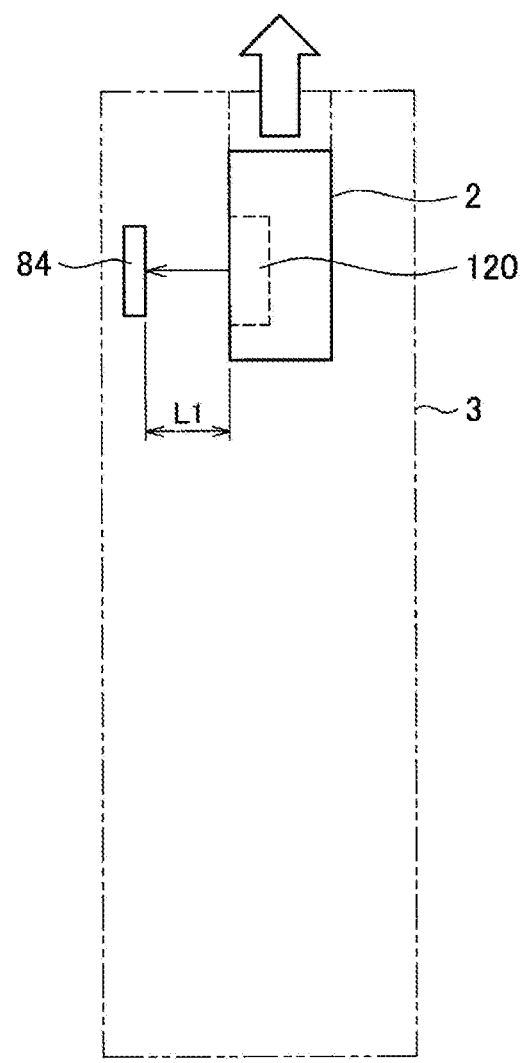
FIG. 26 is a diagram illustrating an example of the structure of the detection sensor according to the third embodiment.

Referring to FIG. 25 and FIG. 26, the structure of a casing of an information processing terminal provided with a pop-up type detection sensor 6 having a light receiving unit 120 is described. In FIG. 25, instead of the ranging sensor 2 having the light emitting unit 110 and the light receiving unit 120 illustrated in FIG. 3, the detection sensor 6 having the light receiving unit 120 is provided to the casing 3, and a light emitter 84 instead of the mirror 80 is provided inside the casing 3. In the pop-up type detection sensor 6, the light emitter 84 emits light, and the light receiving unit 120 receives the emitted light to detect a deviation of the light receiving unit 120.

Figure 27:
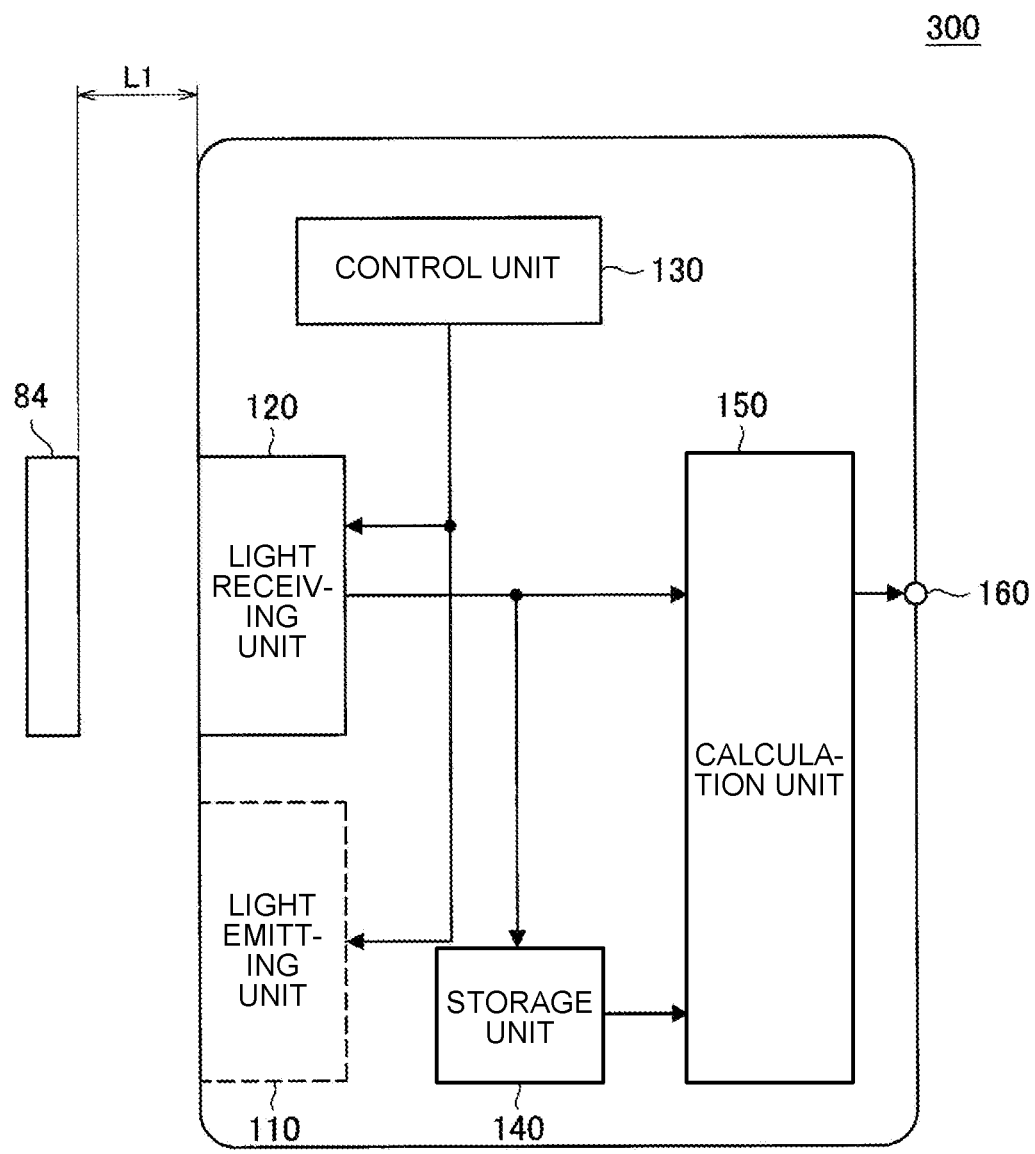
FIG. 27 is a block diagram illustrating an example of a mechanism of the detection sensor according to the third embodiment.

Referring to FIG. 27, various structures and functions included in the casing 3 are described. FIG. 27 is a block diagram illustrating an example of a detection mechanism configured to detect deviation of the light receiving unit 120. A detection mechanism 300 for the deviation of the light receiving unit has the same configuration as the mechanism for the measurement deviation of the ranging sensor 2, but differs in that, in the detection mechanism 100, the light emitter 84 is disposed at a position opposed to the light receiving unit 120. In the third embodiment, the mechanism configured to detect a deviation of the light receiving unit 120 is provided, and hence the light emitting unit 110 is not necessarily required to be provided.

The light emitter 84 is provided to be opposed to the light receiving unit 120, and has a function for emitting light to the light receiving unit 120. Similarly to the light emitting unit 110, for example, the light emitter 84 may include a light emitting diode (LED) light source for emitting infrared light.

(4.1.1.2. Operation Flows for Deviation Detection)

Figure 28:
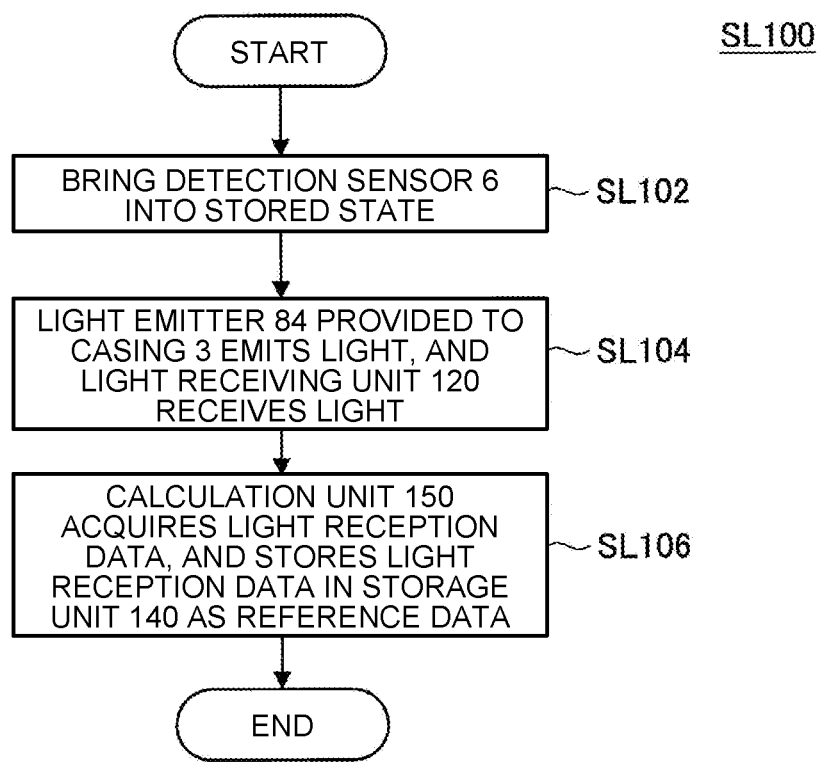
FIG. 28 is a flowchart illustrating an example of an operation flow of the detection sensor according to the third embodiment.
Figure 29:
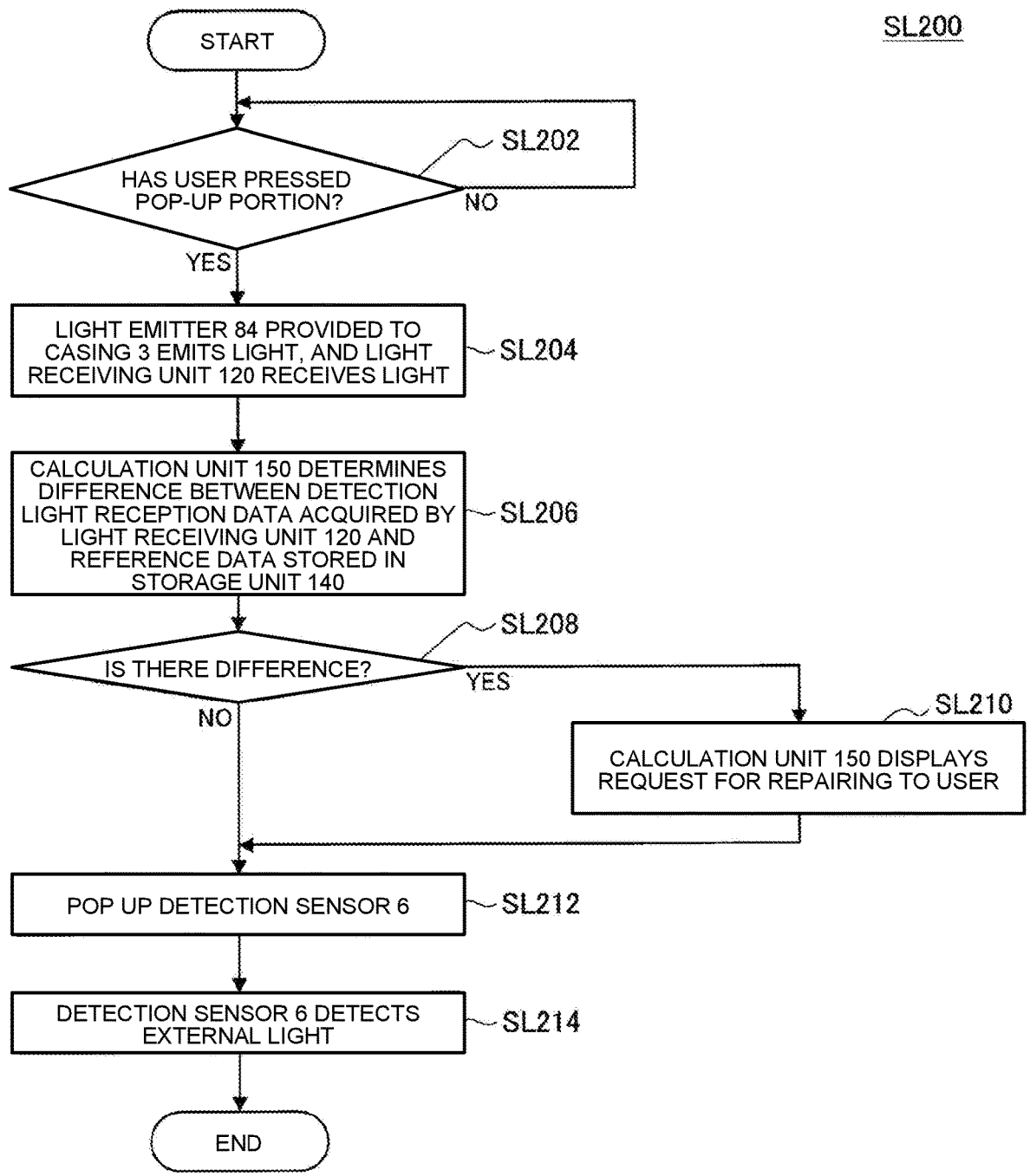
FIG. 29 is a flowchart illustrating an example of the operation flow of the detection sensor according to the third embodiment.

Operation flows of the configurations illustrated in FIG. 27 are described with reference to FIG. 28 and FIG. 29. FIG. 28 illustrates an operation flow (SL100) for acquiring reference data serving as a reference for detecting deviation of the light receiving unit. FIG. 29 illustrates an operation flow (SL200) for detecting deviation of the light receiving unit by using the reference data.

Referring to FIG. 28, first, the detection sensor 6 is brought into a state of being stored in the casing 3 (SL102). The stored state refers to a state in which the detection sensor 6 is buried in the casing 3.

Next, the light emitter 84 provided to the casing 3 emits light, and the light receiving unit 120 receives light (SL104). In response to the reception of light, the light receiving unit 120 generates light reception data.

Next, the calculation unit 150 acquires the light reception data obtained by the light receiving unit 120, and stores the light reception data in the storage unit 140 as reference data (SL106).

The operation flows for acquiring reference data in the detection sensor 6 have been described above. The operation for acquiring reference data may be performed before the product of the ranging sensor 2 is shipped, and the reference data may be stored in the detection sensor 6 in advance. Alternatively, a user may acquire reference data as appropriate to generate the reference data. The detection sensor 6 uses the thus acquired reference data to detect a deviation of the light receiving unit 120.

Referring to FIG. 29, the detection of deviation of the light receiving unit by using reference data is described.

First, whether the user has pressed the pop-up type detection sensor 6 is determined by the detection sensor 6 (SL202). When it is determined that the user has pressed the detection sensor 6 (Yes at SL202), the flow proceeds to the next processing. When it is determined that the user has not pressed the detection sensor 6 (No at SL202), on the other hand, whether the user has pressed the detection sensor 6 is determined.

In the pop-up type detection sensor 6, when the user presses the detection sensor 6 once, the popup mechanism operates so that the detection sensor 6 may appear from the casing 3. Thus, when pressed, the detection sensor 6 is popped up for ranging, and hence by determining the press timing and performing the operation for detecting a deviation of the light receiving unit before the popup, the deviation of the light receiving unit can be detected before the start of ranging.

Next, the light emitter 84 provided to the casing 3 emits light, and the light receiving unit 120 receives light (SL204). The light receiving unit 120 generates detection light reception data.

Next, the calculation unit 150 compares the detection light reception data acquired by the light receiving unit 120 with the reference data stored in the storage unit 140, and determines a difference therebetween (SL206).

The calculation unit 150 determines whether the difference is present (SL208). The calculation unit 150 may determine whether there is a difference by determining whether the difference falls within a predetermined range. When there is no difference (No at SL208), the detection sensor 6 is popped up (SL212).

When the difference is present (Yes at SL208), on the other hand, the calculation unit 150 displays a request for repairing of the detection sensor 6 to the user (SL210).

After the request for repairing is displayed, the detection sensor 6 is popped up (SL212).

The pop-upped detection sensor 6 detects external light (SL214).

The pop-up type detection sensor 6 detects a deviation of the light receiving unit in the detection sensor 6 through the above-mentioned operation flow.

In the third embodiment, the detection of a deviation of the light receiving unit is started with the determination as to whether the pop-up type detection sensor 6 has been pressed as a trigger. However, the deviation of the light receiving unit may be regularly detected. When the detection sensor 6 is not popped up from the casing 3, the deviation of the light receiving unit may be regularly detected.

(4.1.2. Cradle Type)

The pop-up type detection sensor has been described above. The technology in the present disclosure is also applicable to other detection sensors than the pop-up type detection sensor. In this section, an example in which a detection sensor is built in a casing of an information processing terminal and a deviation of the light receiving unit in the detection sensor is detected by a cradle type is described.

(4.1.2.1. Configuration)

Figure 30:
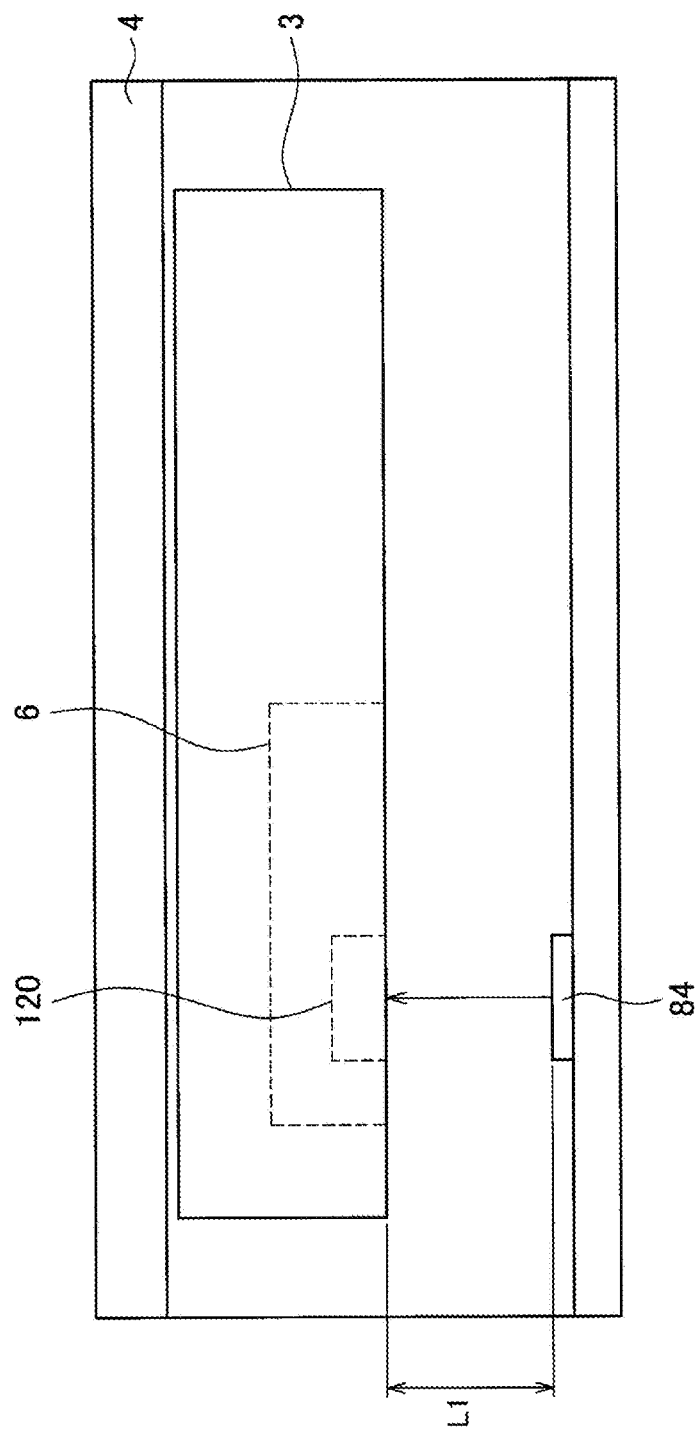
FIG. 30 is a diagram illustrating an example of a modification of the structure of the detection sensor according to the third embodiment.
Figure 31:
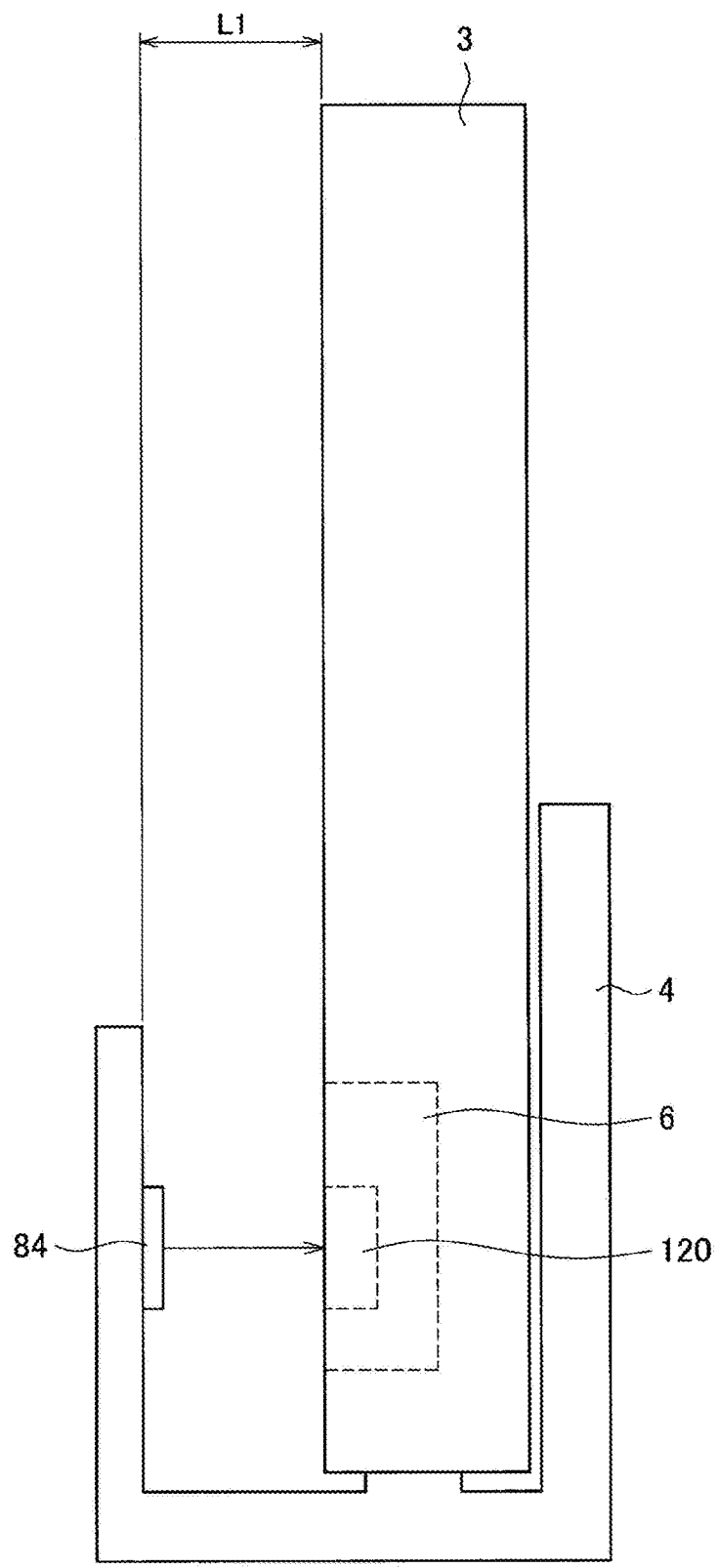
FIG. 31 is a diagram illustrating an example of a modification of the structure of the detection sensor according to the third embodiment.
Figure 32:
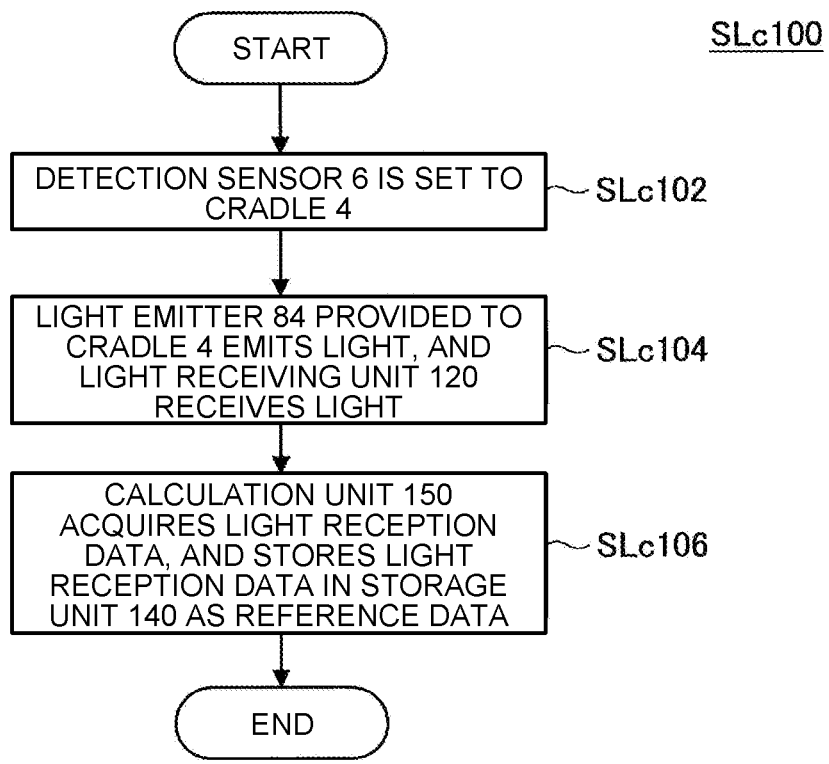
FIG. 32 is a flowchart illustrating an operation flow in a modification of the detection sensor according to the third embodiment.
Figure 33:
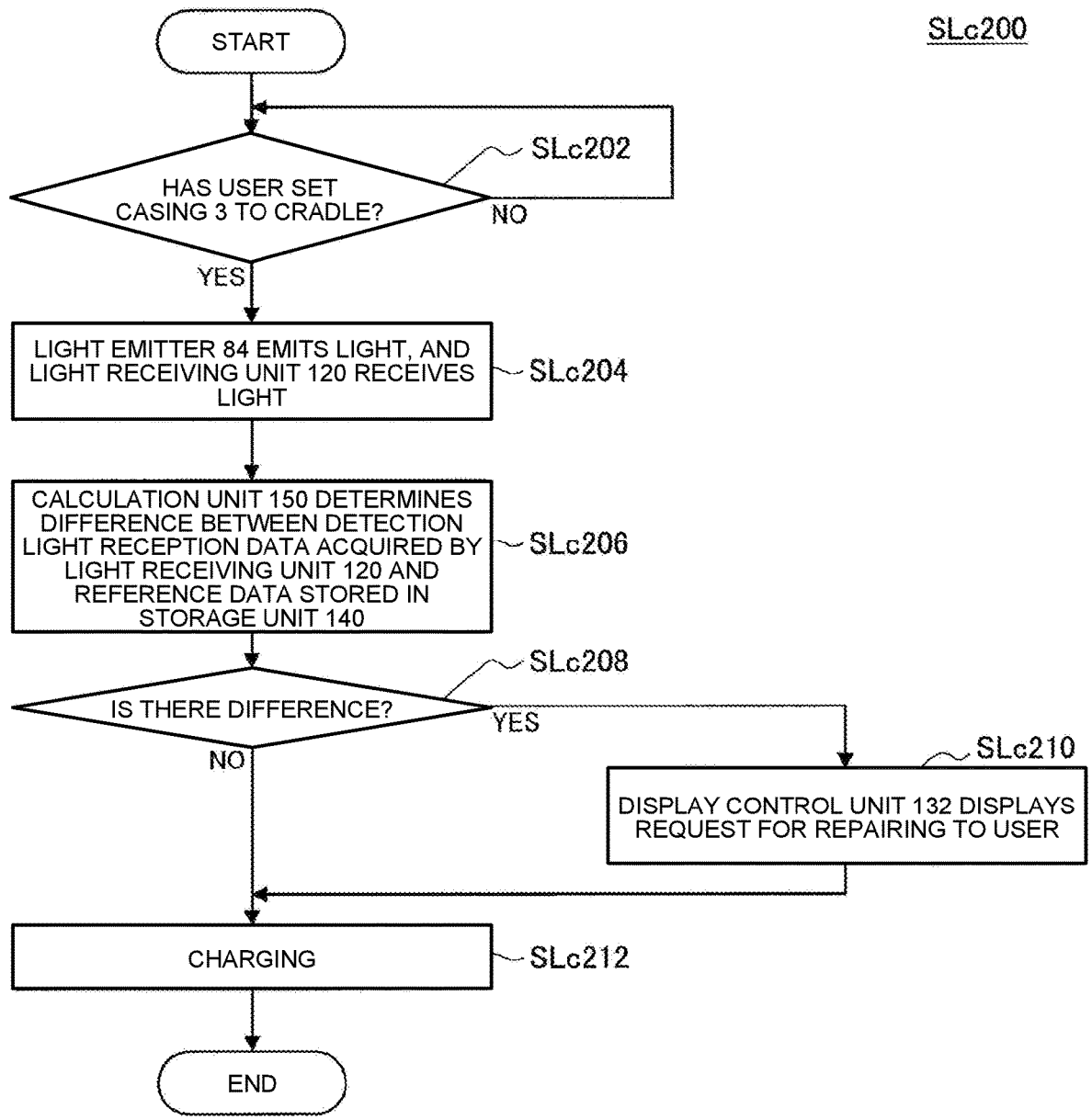
FIG. 33 is a flowchart illustrating an operation flow in a modification of the detection sensor according to the third embodiment.

Referring to FIG. 30 to FIG. 33, an example of detection of a deviation of the light receiving unit of the cradle type detection sensor is described. FIG. 30 and FIG. 31 are diagrams illustrating how a casing 3 of an information processing terminal is set to the cradle 4. FIG. 32 and FIG. 33 are diagrams illustrating operation flows for detecting a deviation of the light receiving unit in the cradle type detection sensor.

Referring to FIG. 30, the detection sensor 6 is provided inside the casing 3. A cradle 4 is attached to the casing 3. The cradle 4 is a device having a function for charging and data transfer when connected to the casing 3.

A light emitter 84 is provided on one side surface of a recess in the cradle 4 on the casing 3 side. When the casing 3 is set to the cradle 4, the light emitter 84 is provided at a position opposed to the detection sensor 6 at a distance L1 from the detection sensor 6. In the detection sensor 6, the light emitter 84 emits light to the light receiving unit 120, and the light receiving unit 120 receives the light to detect a deviation of the light receiving unit 120.

(4.1.2.2. Operation Flows for Deviation Detection)

Various configurations and functions are the same as those in the pop-up type, and hence the descriptions thereof are omitted. Referring to FIG. 32 and FIG. 33, operation flows for detecting a deviation of the light receiving unit are described.

Referring to FIG. 32, first, the detection sensor 6 is set to the cradle 4 (SLc102).

Next, the light emitter 84 provided to the cradle 4 emits light, and the light receiving unit 120 receives light (SLc104).

Next, the calculation unit 150 acquires light reception data, and stores the light reception data in the storage unit 140 as reference data (SLc106).

The operation flows for acquiring reference data by the cradle type in the detection sensor 6 have been described above. The operation for acquiring reference data may be performed before the product of the detection sensor 6 is shipped, and the reference data may be stored in the detection sensor 6 in advance. Alternatively, a user may acquire reference data as appropriate to generate the reference data. The detection sensor 6 uses the thus acquired reference data to detect a measurement deviation.

Next, the detection of a measurement deviation by using reference data is described with reference to FIG. 33.

First, the detection sensor 6 determines whether the user has set the casing 3 to the cradle 4 (SLc202). When it is determined that the user has set the casing 3 to the cradle 4 (Yes at SLc202), the flow proceeds to the next processing. When it is determined that the user has not set the casing 3 to the cradle 4 (No at SLc202), on the other hand, whether the user has set the casing 3 to the cradle 4 is continuously determined.

Next, in the detection sensor 6, the light emitter 84 emits light, and the light receiving unit 120 receives light (SLc204). The light receiving unit 120 generates detection light reception data.

Next, the calculation unit 150 compares the detection light reception data with the reference data stored in the storage unit 140, and determines a difference therebetween (SLc206).

The calculation unit 150 determines whether the difference is present (SLc208). The calculation unit 150 may determine whether there is a difference by determining whether the difference falls within a predetermined range. When there is no difference (No at SLc208), the information processing terminal is charged through the cradle 4 (SLc212).

When the difference is present (Yes at SLc208), on the other hand, the calculation unit 150 displays a request for repairing of the detection sensor 6 to the user (SLc210).

After the request for repairing is displayed, the information processing terminal is charged through the cradle 4 (Sc212).

For detection of a deviation of the light receiving unit 120 in the cradle type, the deviation of the light receiving unit in the detection sensor 6 is detected through the above-mentioned operation flows.

(4.2. Black Level Correction)

As a modification of the third embodiment, black level among pieces of light reception data generated when the light receiving unit 120 receives light is described. For example, in the case where the light receiving unit 120 is an RGB sensor, image processing of images taken by the RGB sensor is performed in a manner that pixel values of a black board that almost completely absorbs light in a visible light bandwidth are used as a reference of black level.

However, the reference of black level may change due to aged deterioration or environmental temperature. This may affect the image processing. By applying the present technology to correct the black level, the image processing can be more accurately performed.

(4.2.1. Pop-Up Type)

Figure 34:
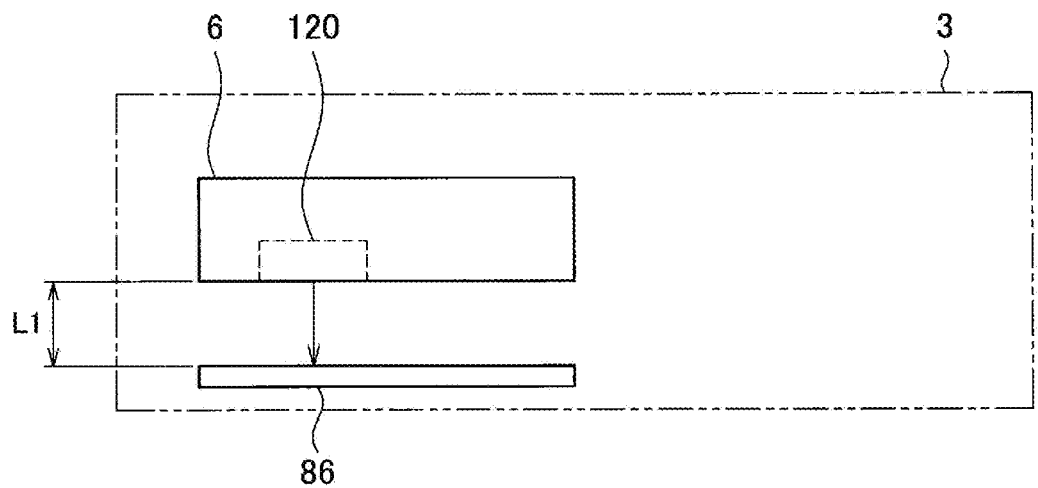
FIG. 34 is a diagram illustrating an example of the structure of the detection sensor according to the third embodiment.
Figure 35:
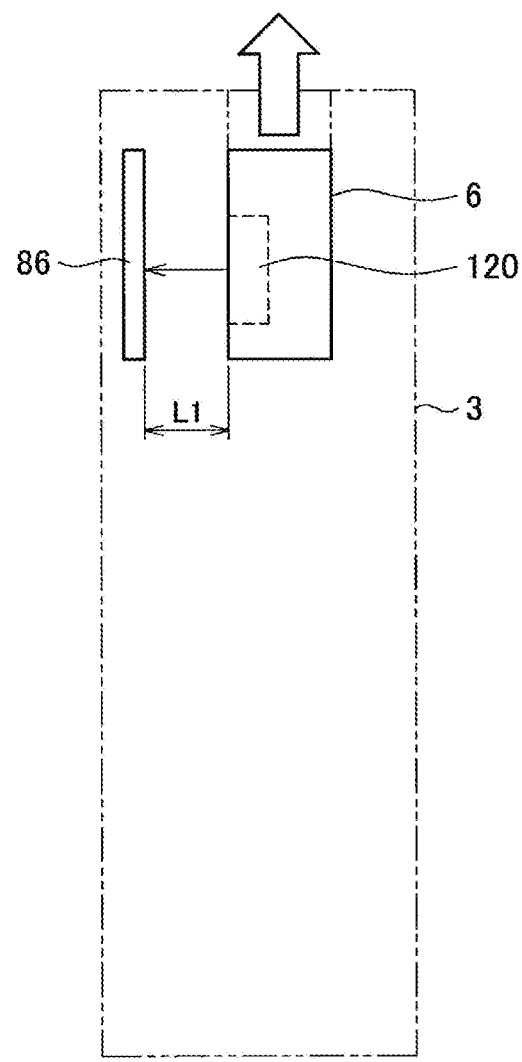
FIG. 35 is a diagram illustrating an example of the structure of the detection sensor according to the third embodiment.

Referring to FIG. 34 and FIG. 35, the internal structure and functions of a casing of an information processing terminal provided with a pop-up type detection sensor are described. FIG. 34 is a diagram of the casing 3 illustrated in FIG. 2 as seen from above one surface the inner side of which is provided with a detection sensor 6. FIG. 35 is a diagram illustrating the casing 3 illustrated in FIG. 2 provided with the detection sensor 6 as seen from the side.

(4.2.1.1. Configuration)

Referring to FIG. 34 and FIG. 35, in the casing 3, a black board 86 is provided as a reference object so as to be opposed to the detection sensor 6 with a distance L1. The detection sensor 6 receives light by the light receiving unit 120 opposed to the black board 86, and acquires black level to correct a taken image.

In FIG. 35 where the casing 3 is seen from the side, the detection sensor 6 is provided on one side in which the long sides extend, and a black board 86 is provided to be opposed to the detection sensor 6. The detection sensor 6 is movable in the direction in which the long sides of the casing 3 extend, and can appear from the casing 3. Black level is acquired when the detection sensor 6 is buried in the casing 3.

Figure 36:
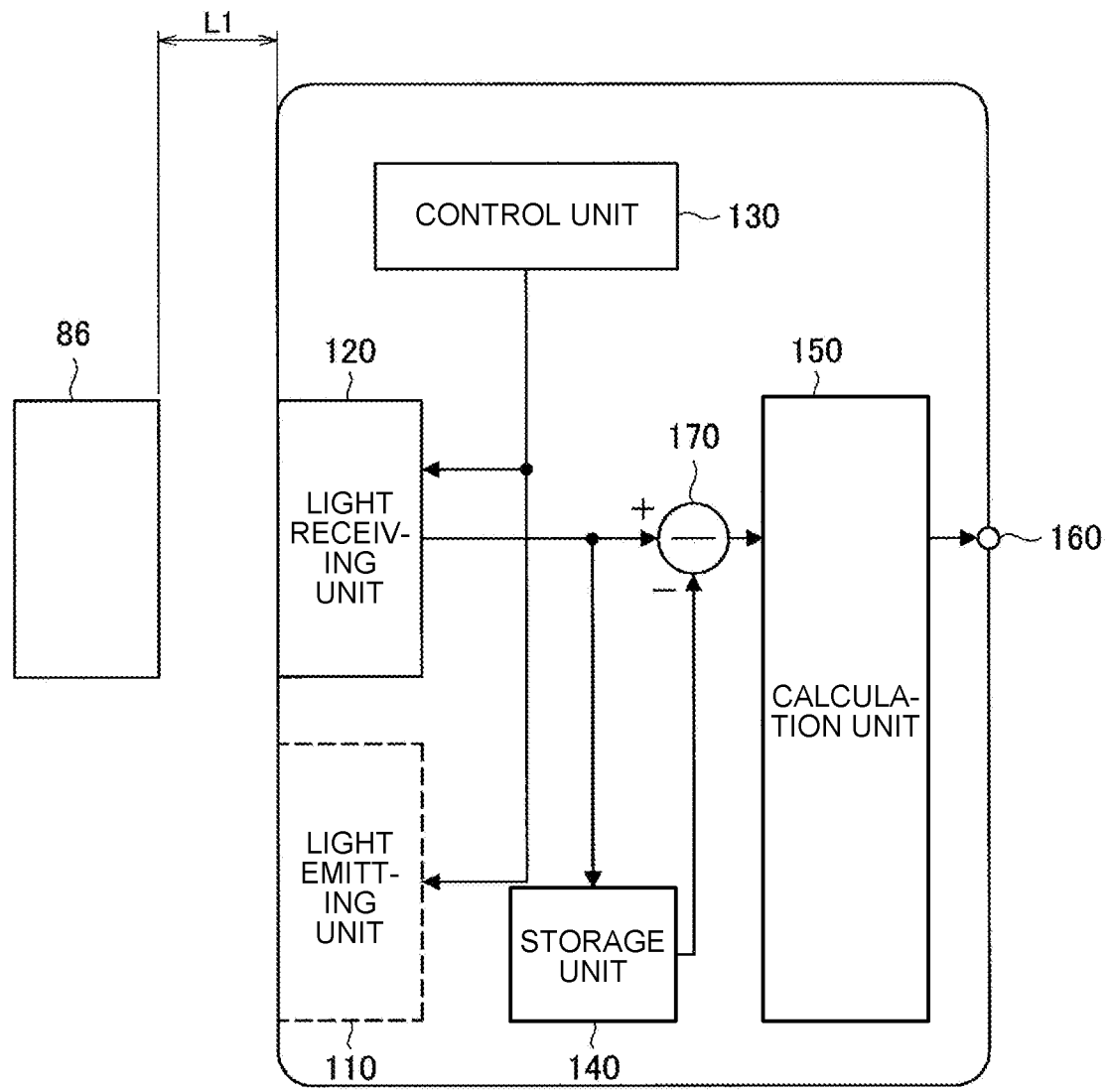
FIG. 36 is a block diagram illustrating an example of a modification of a mechanism of the detection sensor according to the third embodiment.

Referring to FIG. 36, a black level correction mechanism 400 provided to the casing 3 and its function are described. FIG. 36 is a block diagram illustrating an example of a black level correction mechanism 400 configured to correct black level. The black level correction mechanism 400 is different from the detection mechanism 100 for measurement deviations illustrated in FIG. 5 in that the mirror 80 is replaced with the black board 86 and a subtractor 170 is further provided. The black level may be corrected when the detection sensor 6 does not have the light emitting unit. The light emitting unit 110 may be provided, but is not necessarily required to be provided.

In the black level correction mechanism 400, a light receiving unit 120, a control unit 130, a storage unit 140, a calculation unit 150, an output terminal 160, a subtractor 170, and a black board 86 are provided.

The description of the same structure as that of the detection mechanism 100 for measurement deviations illustrated in FIG. 5 is omitted, and differences are described below.

The black board 86 is provided to be opposed to the light receiving unit 120. The black board 86 is a member that almost completely absorbs light in a visible light bandwidth and that is provided to be black. The black board 86 may be formed from material having low reflectivity of light in the visible light bandwidth.

The subtractor 170 has a function for acquiring light reception data generated by the light receiving unit 120 and black level reference data stored in the storage unit 140 and calculating the subtraction data to correct the black level. The subtractor 170 outputs the subtraction data with the corrected black level to the calculation unit 150. The calculation unit 150 uses the subtraction data to generate a taken image with the corrected black level.

(4.2.1.2. Black Level Correction Flow)

Figure 37:
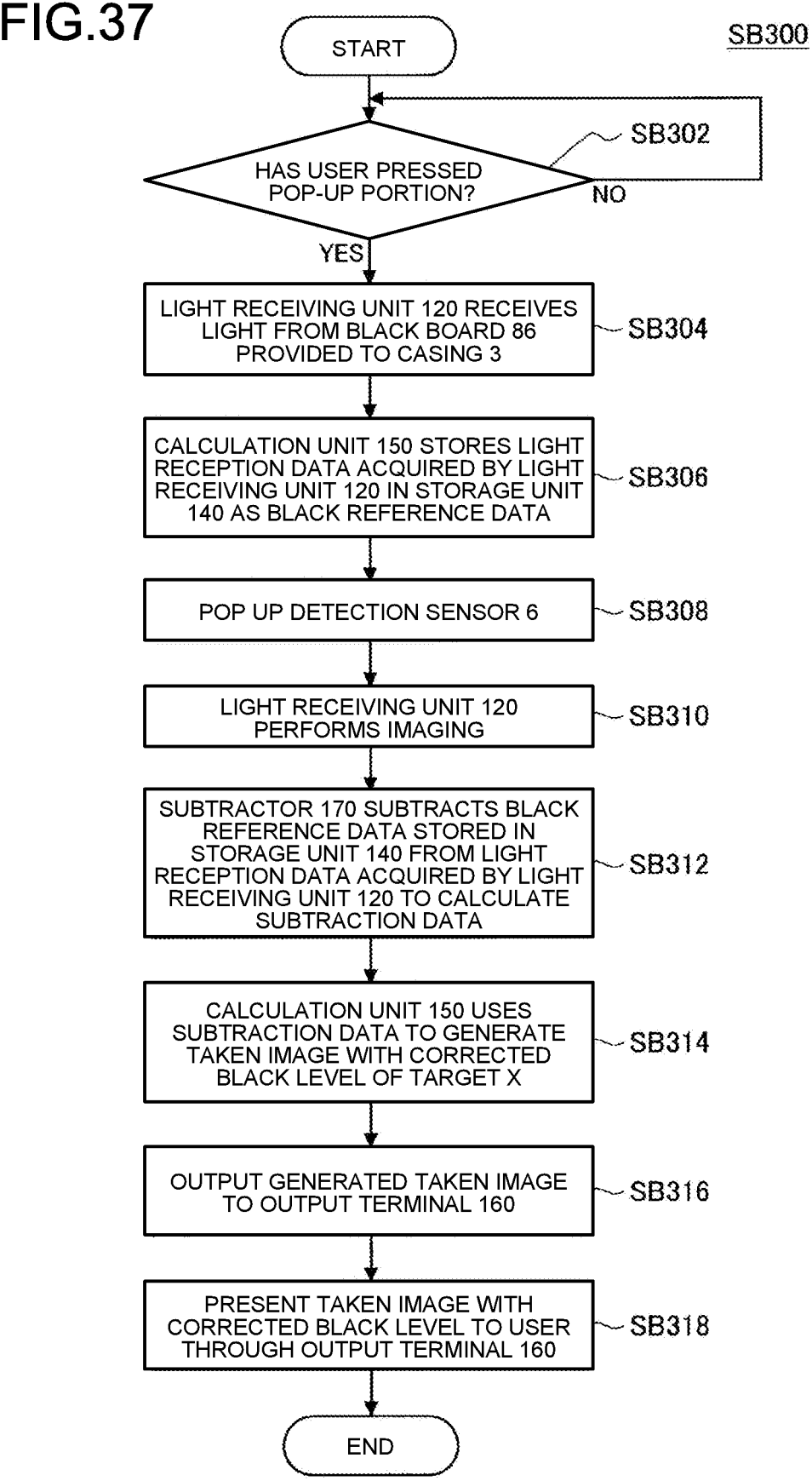
FIG. 37 is a flowchart illustrating an operation flow in a modification of the detection sensor according to the third embodiment.

Referring to FIG. 37, an operation flow of the configurations described above with reference to FIG. 36 is described. FIG. 36 illustrates an operation flow for correcting black level.

First, the detection sensor 6 determines whether a user has pressed the pop-up type detection sensor 6 (SB302).

Next, the light receiving unit 120 receives light from the black board 86 provided to the casing 3 (SB304).

Next, the calculation unit 150 stores light reception data acquired by the light receiving unit 120 in the storage unit 140 as black reference data (SB306).

Next, the detection sensor 6 is popped up (SB308).

Next, imaging is performed by the light receiving unit 120 (SB310).

Next, the subtractor 170 subtracts the black reference data stored in the storage unit 140 from the light reception data obtained by the light receiving unit 120 to calculate subtraction data (SB312).

Next, the calculation unit 150 uses the subtraction data to generate a taken image in which the black level of the target X has been corrected (SB314).

Next, the calculation unit 150 outputs the generated taken image to the output terminal 160 (SB316).

Next, the taken image with the corrected black level is presented to the user through the output terminal 160 (S318).

As described above, in the detection sensor 6, a taken image with corrected black level can be generated to obtain a clearer image.

(4.2.2. Cradle Type)

The pop-up type black level correction has been described above. The technology in the present disclosure is also applicable to other detection sensors than the pop-up type detection sensor. In this section, an example in which a detection sensor is built in a casing and black level of the detection sensor is corrected by a cradle type is described.

(4.2.2.1. Configuration)

Figure 38:
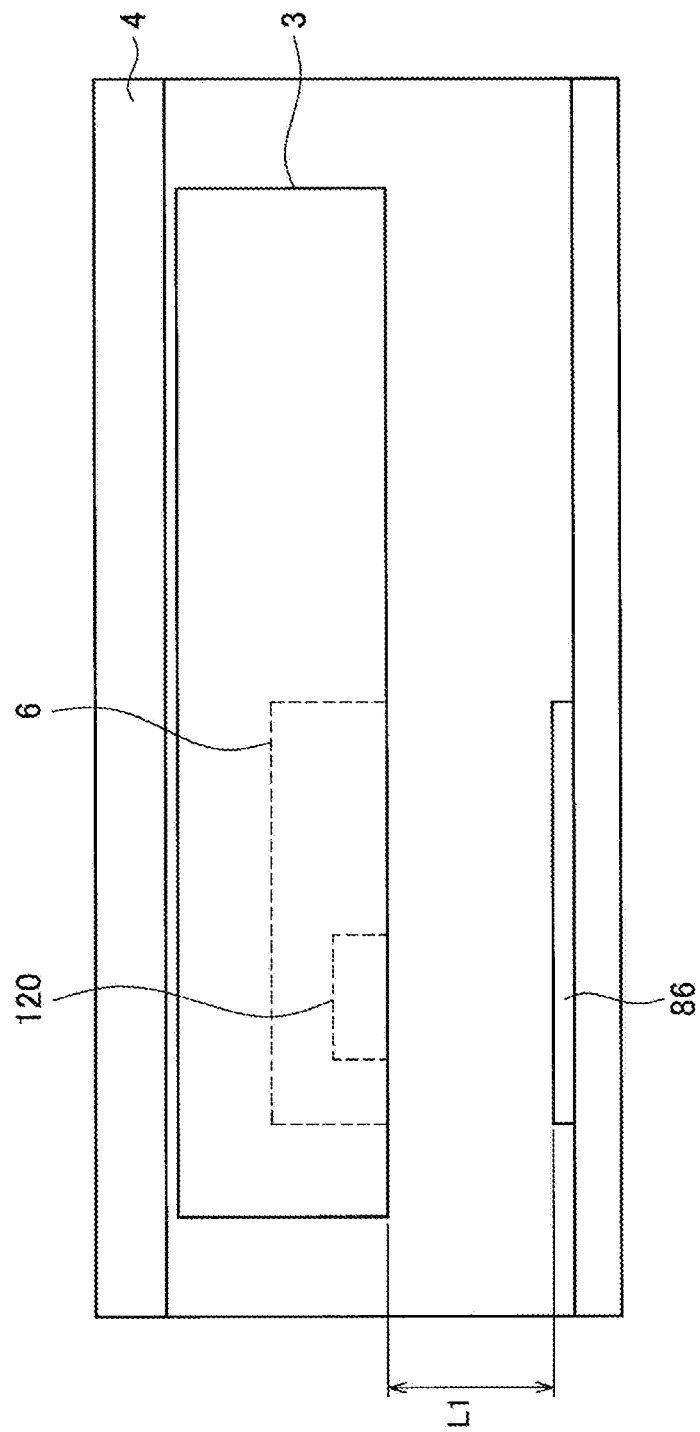
FIG. 38 is a diagram illustrating an example of a modification of the structure of the detection sensor according to the third embodiment.
Figure 39:
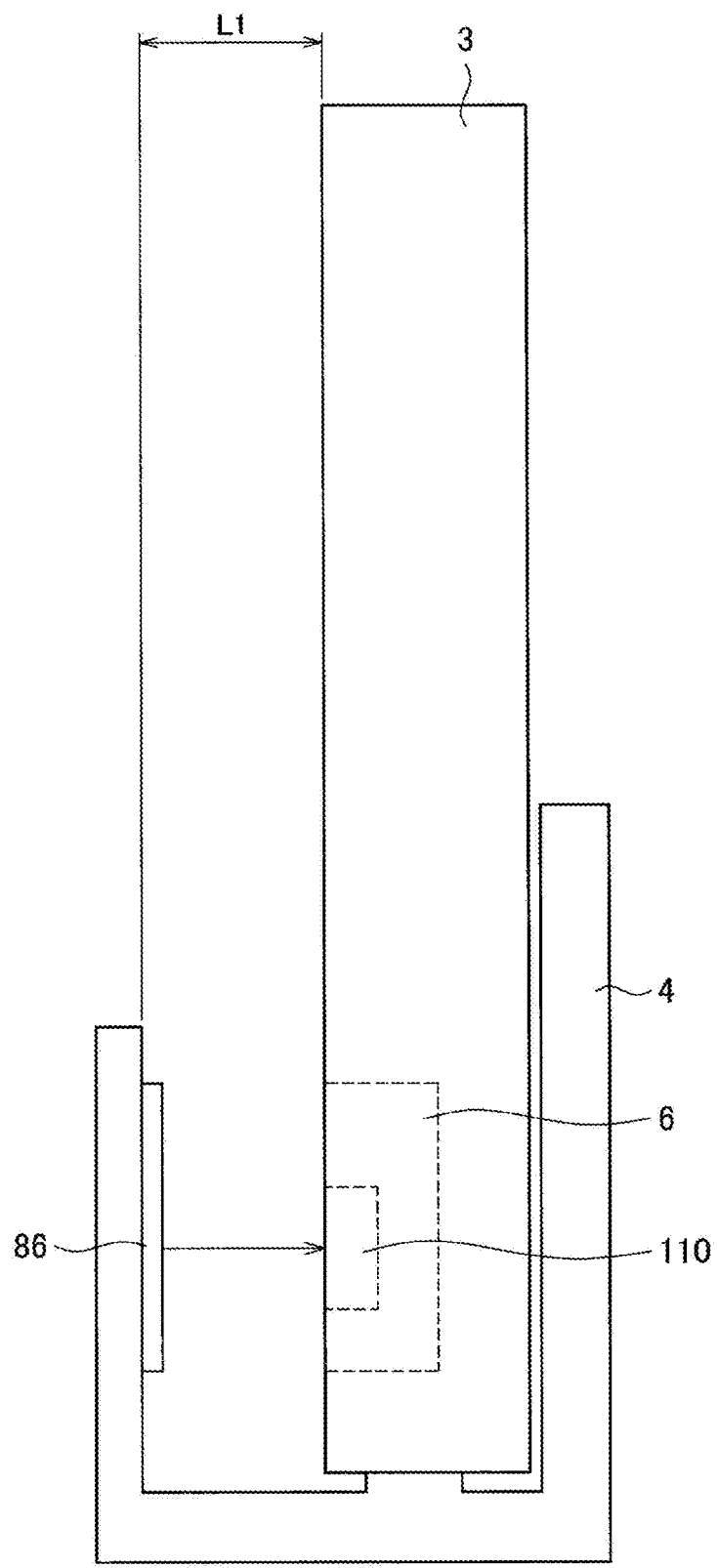
FIG. 39 is a diagram illustrating an example of a modification of the structure of the detection sensor according to the third embodiment.
Figure 40:
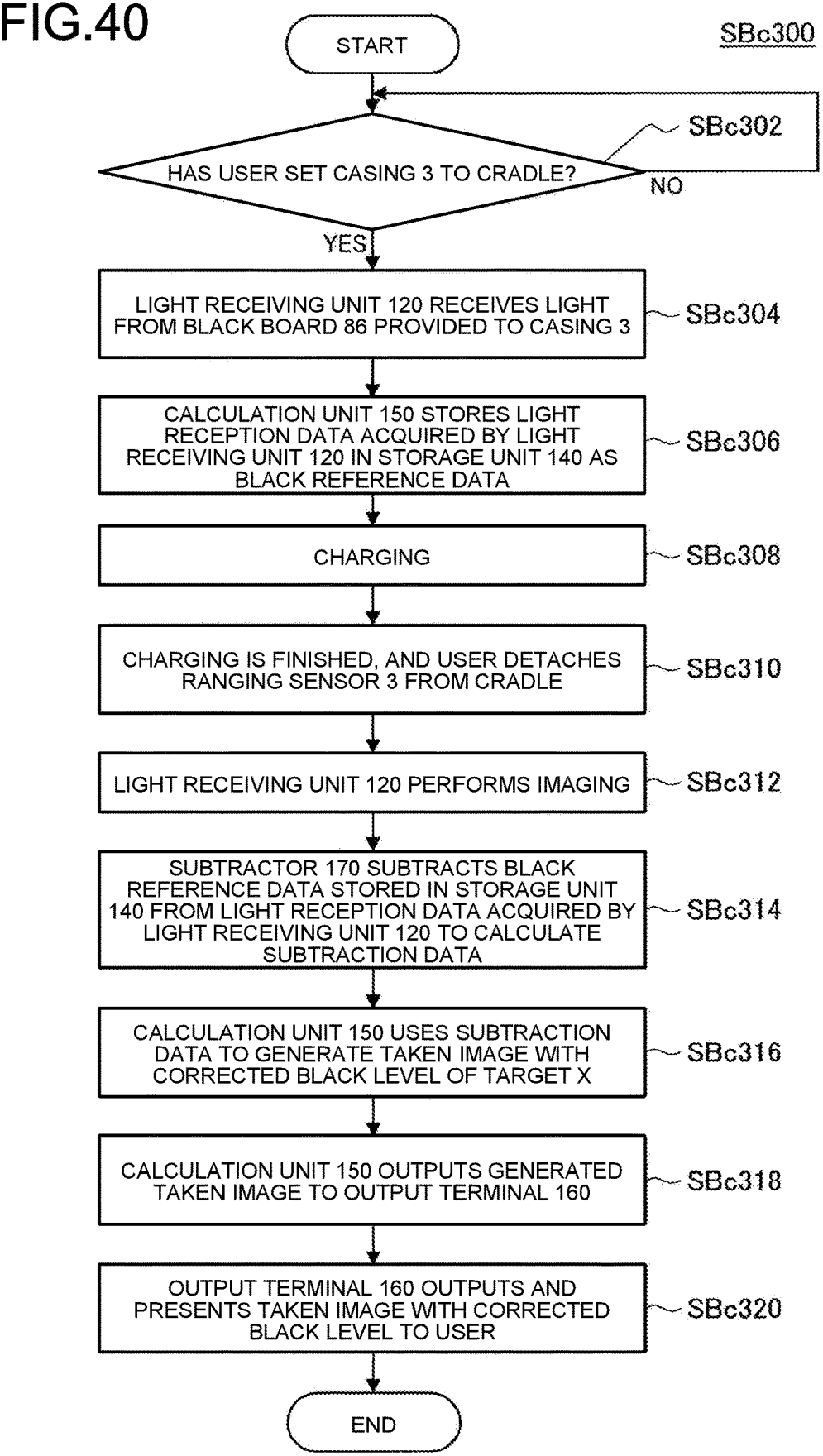
FIG. 40 is a flowchart illustrating an operation flow in a modification of the detection sensor according to the third embodiment.

FIG. 38 and FIG. 39 are diagrams illustrating how a casing of an information processing terminal is set to a cradle. FIG. 40 is a diagram illustrating a black level correction flow in a cradle type.

Referring to FIG. 38 and FIG. 39, the detection sensor 6 is provided inside the casing 3. A cradle is attached to the casing 3. The cradle 4 is a device having a function for charging the casing 3 and transferring data when connected to the casing 3.

In the pop-up type detection sensor 6, the black board 86 serving as a reference object for black level correction is provided in the casing 3, but in the cradle type, the black board 86 serving as a reference object is provided to the cradle 4.

The black board 86 is provided on one side surface of a recess in the cradle 4 on the casing 3 side. When the casing 3 is set to the cradle 4, the black board 86 is provided at a position opposed to the detection sensor 6 with a distance L1 from the detection sensor 6. In the detection sensor 6, the light receiving unit 120 receives light from the black board 86, and black level is acquired and corrected.

(4.2.2.2. Operation Flow for Deviation Detection)

Similarly to the pop-up type, the calculation unit 150 corrects black level. Referring to FIG. 40, the correction of black level is described. FIG. 40 is a diagram illustrating a correction flow for black level.

Referring to FIG. 40, the correction flow for black level is described in detail.

First, the detection sensor 6 determines whether the user has set the casing 3 to the cradle 4 (SBc302).

Next, the light receiving unit 120 receives light from the black board 86 provided to the casing 3 (SBc304).

Next, the calculation unit 150 stores light reception data acquired by the light receiving unit 120 in the storage unit 140 as black reference data (SBc306).

Next, the casing 3 is charged (SBc308).

Next, the user detaches the casing 3 including the detection sensor 6 from the cradle (SBc310).

Next, imaging is performed by the light receiving unit 120 (SBc312).

Next, the subtractor 170 subtracts the black reference data stored in the storage unit 140 from the light reception data acquired by the light receiving unit 120 to calculate subtraction data (SBc314).

Next, the calculation unit 150 uses the subtraction data to generate a taken image in which the black level of the target X has been corrected (SBc316).

Next, the calculation unit 150 outputs the generated taken image to the output terminal 160 (SBc318).

Next, the output terminal 160 outputs the taken image with the corrected black level, and presents the taken image to the user (SBc320).

As described above, when black level is corrected by the cradle type, the detection sensor 6 generates a taken image in which a black level correction distance is calculated, and hence a clearer image can be obtained.

5. Applications to Electronic Device

Figure 41:
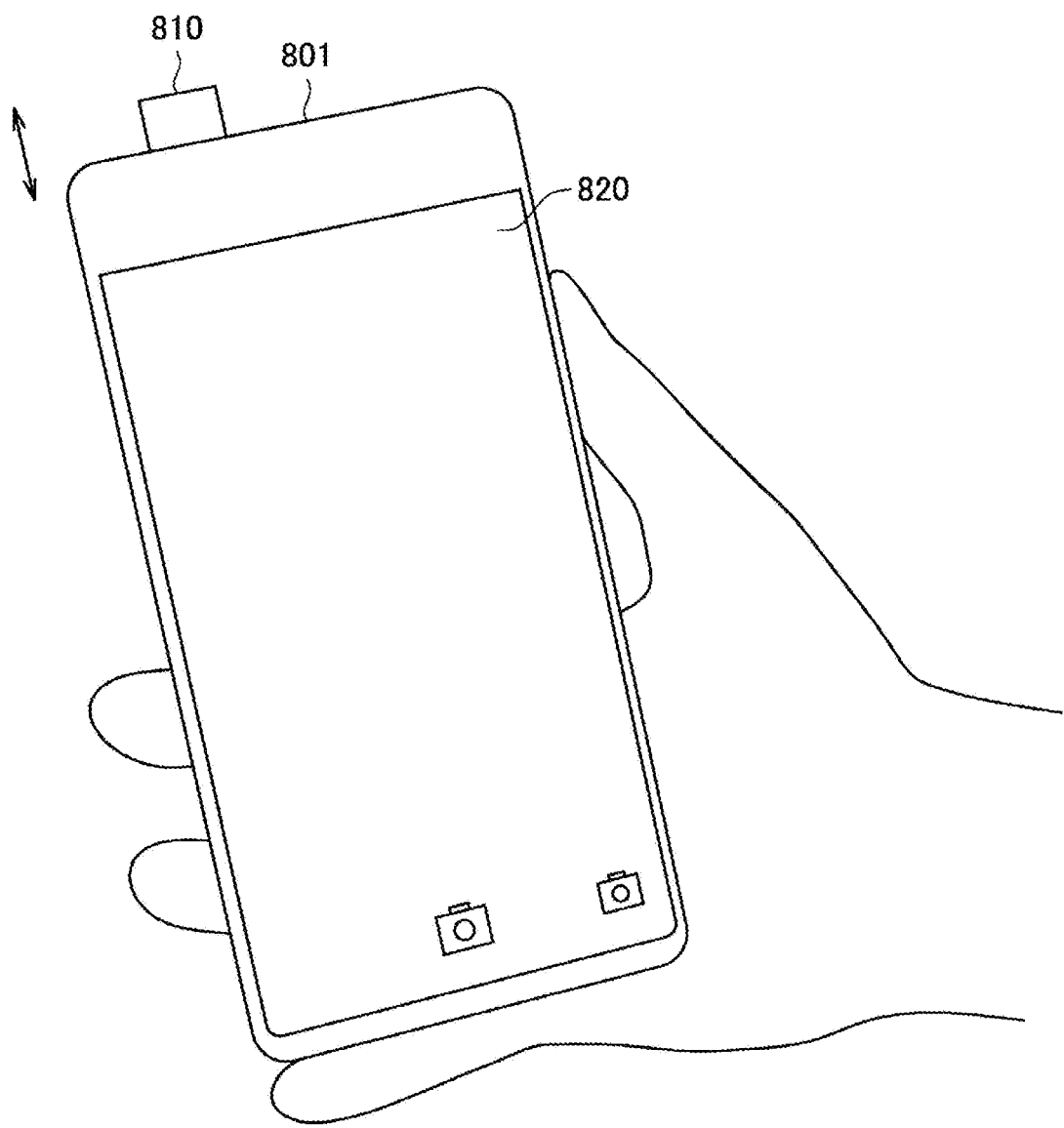
FIG. 41 is an external view illustrating an example of an electronic device to which the technology in the present disclosure is applied.
Figure 42:
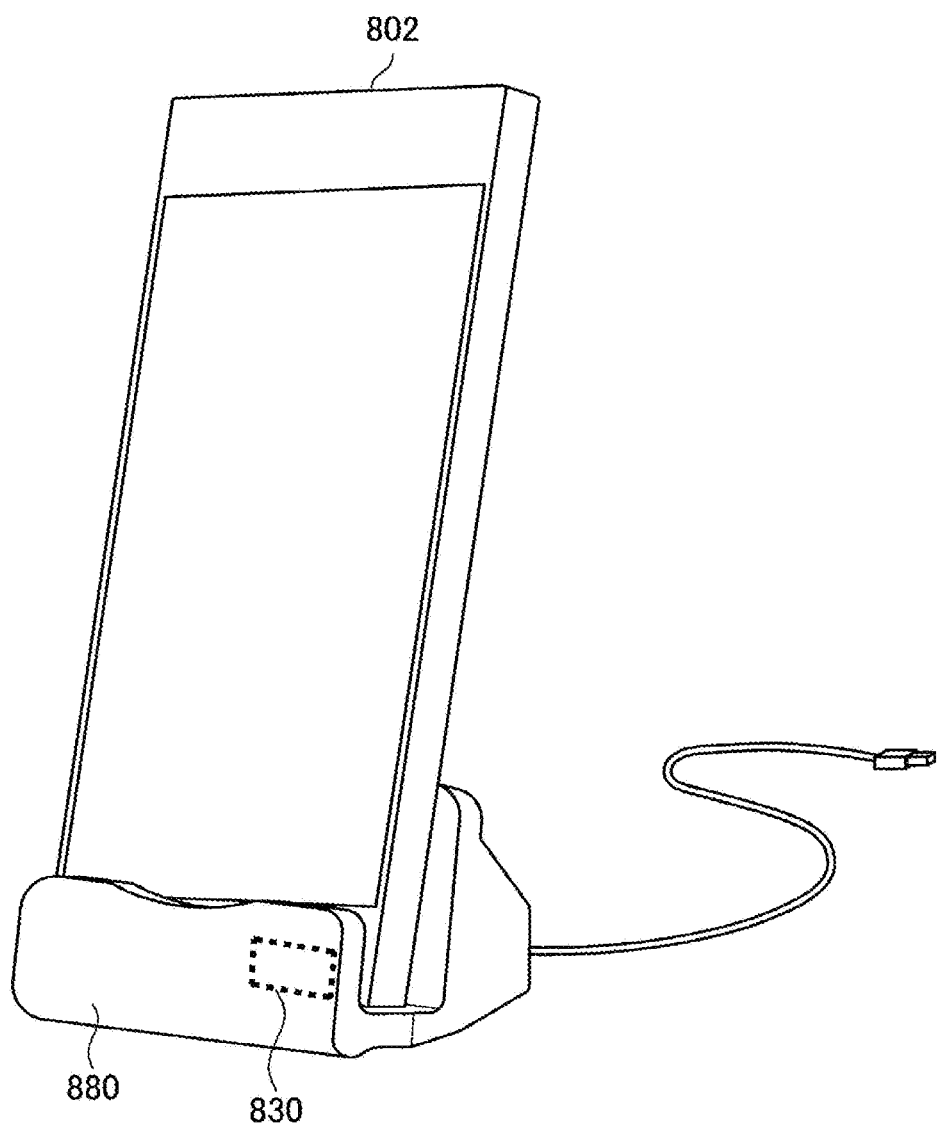
FIG. 42 is an external view illustrating an example of an electronic device to which the technology in the present disclosure is applied.

For example, the technology according to the present disclosure is applicable to an electronic device. An example in which the technology is applied to an electronic device is described with reference to FIG. 41 and FIG. 42. FIG. 41 and FIG. 42 are diagrams illustrating an example in which the present technology is applied to an electronic device.

Referring to FIG. 41, a smartphone 801 has a display region 820, and is provided with a pop-up type imaging device 810. In the pop-up type imaging device 810, the ranging sensor 2 described above in the present embodiment may be mounted. When the ranging sensor 2 is mounted on the smartphone 801 and the present technology is applied, before the imaging device 810 is popped up, the measurement deviation of the ranging sensor 2 can be detected, and the user can recognize the measurement deviation of the ranging sensor 2 through the display region 820. In the imaging device 810, when ranging is performed by the ranging sensor 2, the corrected distance can be calculated to more accurately measure a distance.

Referring to FIG. 42, the imaging device 880 having the ranging sensor 2 mounted thereon is built in the casing for a smartphone 802. The smartphone 802 is set to a cradle 830, so that charging and data communication can be performed. On a side surface of the cradle 830 illustrated in FIG. 42, a reference object is provided at a position opposed to the imaging device 880 when the smartphone 802 is set to the cradle 830, and by applying the present technology, a measurement deviation of the ranging sensor 2 can be detected before the imaging device 880 starts imaging.

6. Applications to Mobile Body

The technology according to the present disclosure (present technology) may be further applied to mobile bodies. For example, the technology according to the present disclosure may be implemented as devices mounted on any kind of mobile bodies, including automobiles, electric vehicles, hybrid electric vehicles, motorcycles, bicycles, personal mobilities, airplanes, drones, ships, and robots.

Figure 43:
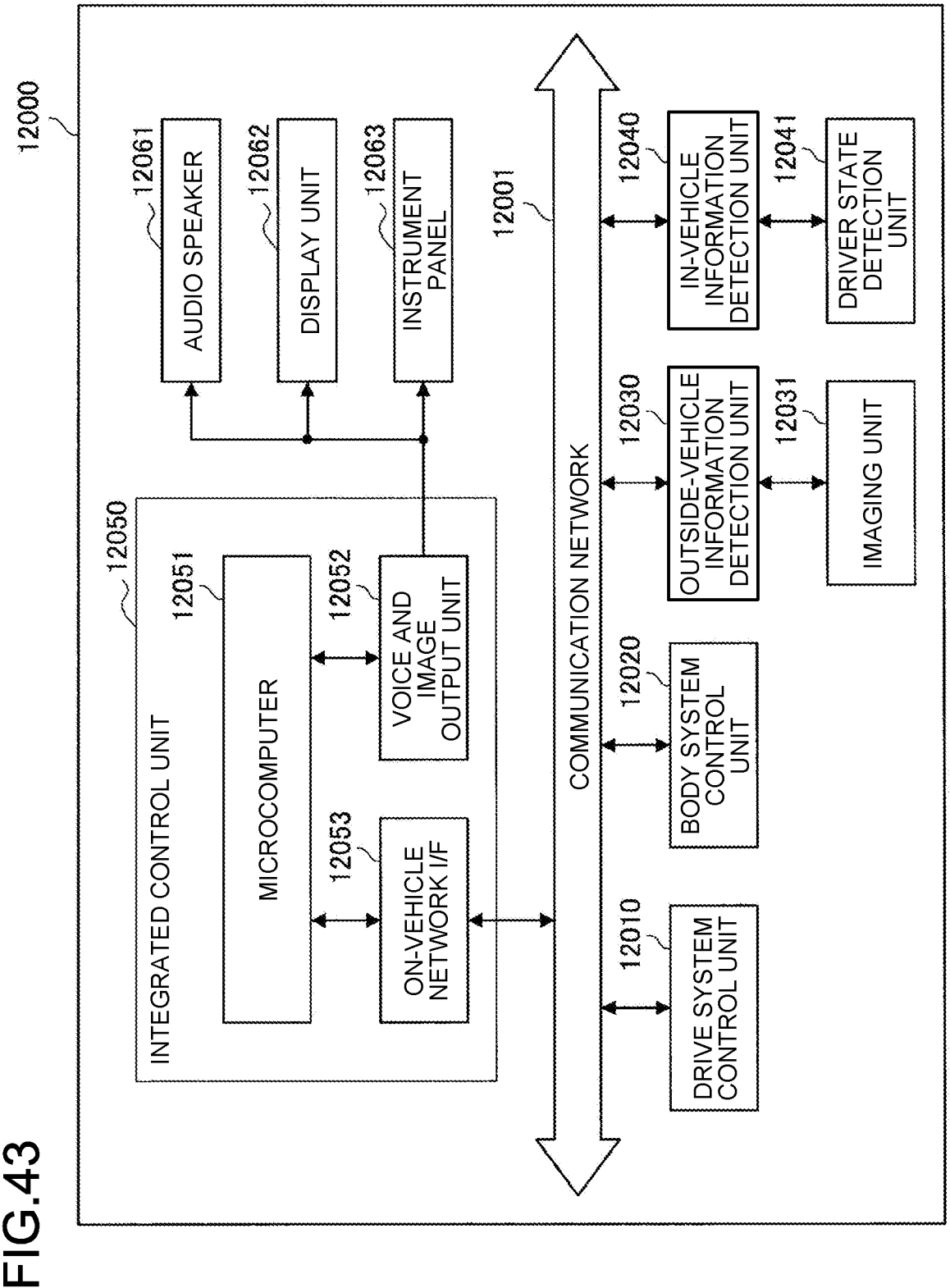
FIG. 43 is a block diagram illustrating an example of a schematic configuration of a vehicle control system.

FIG. 43 is a block diagram illustrating a schematic configuration example of a vehicle control system as an example of a mobile control system to which the technology according to the present disclosure may be applied.

A vehicle control system 12000 includes a plurality of electronic control units connected through a communication network 12001. In the example illustrated in FIG. 43, the vehicle control system 12000 includes a driving system control unit 12010, a body system control unit 12020, an outside-vehicle information detection unit 12030, an in-vehicle information detection unit 12040, and an integrated control unit 12050. As a functional configuration of the integrated control unit 12050, a microcomputer 12051, a voice and image output unit 12052, and an on-vehicle network interface (I/F) 12053 are illustrated.

The driving system control unit 12010 controls the operation of devices related to a driving system of a vehicle in accordance with various kinds of computer programs. For example, the driving system control unit 12010 functions as a control device such as a drive power generation device configured to generate drive power for a vehicle, such as an internal combustion engine and a drive motor, a drive power transmission mechanism configured to transmit drive power to a wheel, a steering mechanism configured to adjust a steering angle of a vehicle, and a braking device configured to generate braking force for a vehicle.

The body system control unit 12020 controls the operation of various kinds of device mounted to the vehicle body in accordance with various kinds of computer programs. For example, the body system control unit 12020 functions as a control device for a keyless entry system, a smart key system, a power window device, or various kinds of lamps such as a head lamp, a back lamp, a brake lamp, a blinker, and a fog lamp. In this case, radio waves transmitted from a mobile terminal substituting for a key or signals from various kinds of switches may be input to the body system control unit 12020. The body system control unit 12020 receives input of the radio waves or the signals to control a door lock device, a power window device, and a lamp of the vehicle.

The outside-vehicle information detection unit 12030 detects information outside a vehicle having the vehicle control system 12000 mounted thereon. For example, an imaging unit 12031 is connected to the outside-vehicle information detection unit 12030. The outside-vehicle information detection unit 12030 causes the imaging unit 12031 to take an image outside the vehicle, and receives the taken image. Based on the received image, the outside-vehicle information detection unit 12030 may perform object detection processing for persons, cars, obstacles, signs, or characters on a road surface or perform distance detection processing.

The imaging unit 12031 is an optical sensor configured to receive light and outputting an electric signal corresponding to the received light amount. The imaging unit 12031 may output the electric signal as an image, and may output the electric signal as ranging information. Light received by the imaging unit 12031 may be visible light or invisible light such as infrared rays.

The in-vehicle information detection unit 12040 detects information inside the vehicle. For example, a driver state detection unit 12041 configured to detect the state of a driver is connected to the in-vehicle information detection unit 12040. For example, the driver state detection unit 12041 includes a camera configured to taking an image of a driver, and the in-vehicle information detection unit 12040 may calculate the degree of fatigue or degree of concentration of the driver or determine whether the driver is asleep based on detection information input from the driver state detection unit 12041.

The microcomputer 12051 can calculate a control target value for a drive power generation device, a steering mechanism, or a braking device based on information inside or outside the vehicle acquired by the outside-vehicle information detection unit 12030 or the in-vehicle information detection unit 12040, and output a control instruction to the driving system control unit 12010. For example, the microcomputer 12051 can perform collaborative control for the purpose of implementing functions of an advanced driver assistance system (ADAS) including vehicle collision avoidance or impact alleviation, tracking traveling, vehicle speed keeping traveling, and vehicle collision warning based on inter-vehicular distance, or vehicle lane deviation warning.

The microcomputer 12051 can perform collaborative control for the purpose of automatic driving to autonomously drive independently of driver's operation by controlling the drive power generation device, the steering mechanism, or the braking device based on information around the vehicle acquired by the outside-vehicle information detection unit 12030 or the in-vehicle information detection unit 12040.

The microcomputer 12051 can output a control instruction to the body system control unit 12030 based on information outside the vehicle acquired by the outside-vehicle information detection unit 12030. For example, the microcomputer 12051 can perform collaborative control for the purpose of antiglare to control a head lamp in accordance with the position of a preceding vehicle or an oncoming vehicle detected by the outside-vehicle information detection unit 12030 and switch from high beams to low beams.

The voice and image output unit 12052 transmits an output signal of at least one of voice and images to an output device capable of notifying a vehicle occupant or the outside of the vehicle of information visually or aurally. FIG. 43 exemplifies an audio speaker 12061, a display unit 12062, and an instrument panel 12063 as output devices. For example, the display unit 12062 may include at least one of an onboard display and a head-up display.

Figure 44:
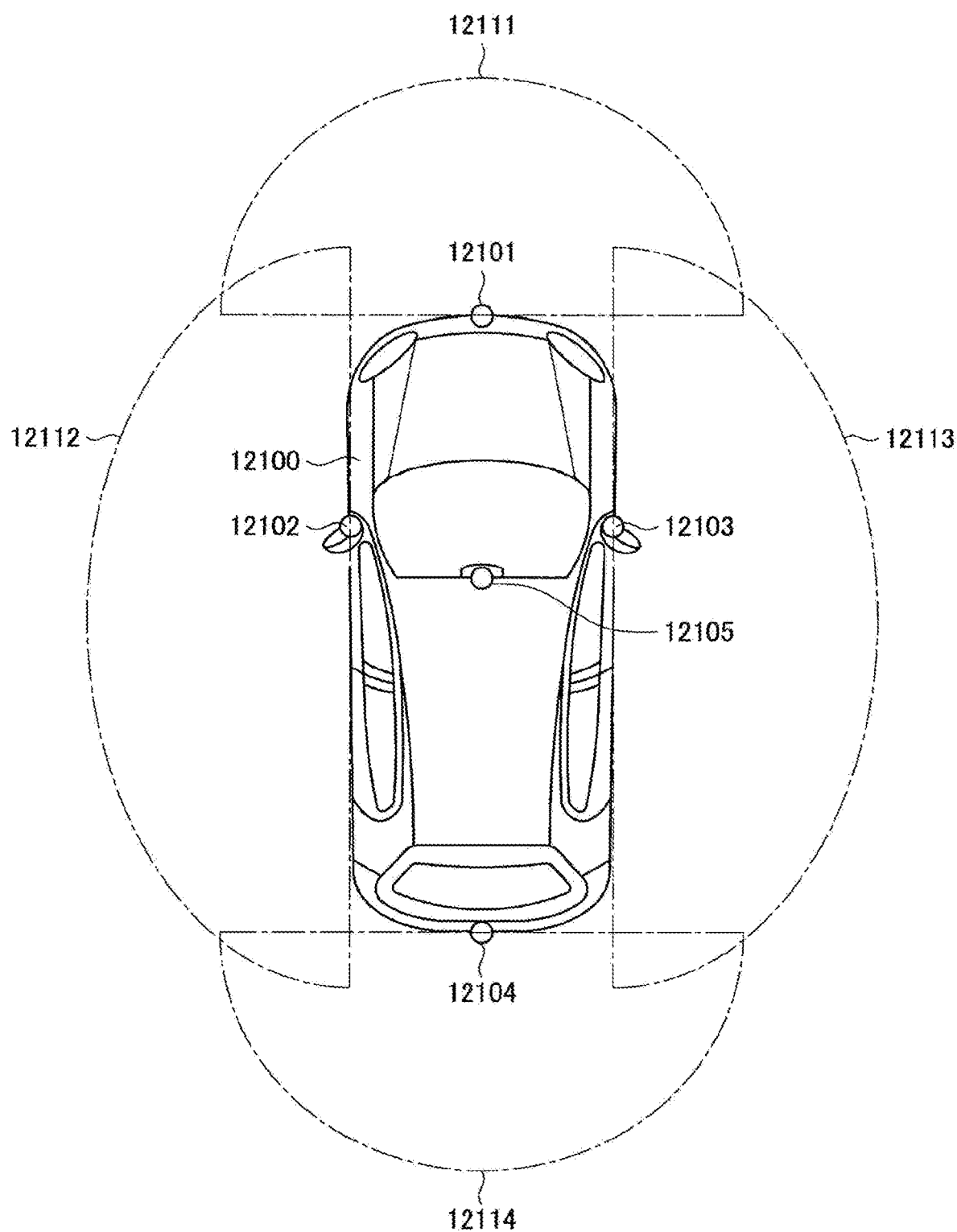
FIG. 44 is an explanatory diagram illustrating an example of installation positions of an outside-vehicle information detection unit and imaging units.

FIG. 44 is a diagram illustrating an example of an installation position of the imaging unit 12031.

In FIG. 44, as the imaging unit 12031, imaging units 12101, 12102, 12103, 12104, and 12105 are provided.

For example, the imaging units 12101, 12102, 12103, 12104, and 12105 are provided at positions of a front nose, side mirrors, a rear bumper, and a back door of a vehicle 12100 and an upper part of a front window in the vehicle interior. The imaging unit 12101 provided to the front nose and the imaging unit 12105 provided at the upper part of the front window in the vehicle interior mainly acquire images in front of the vehicle 12100. The imaging units 12102 and 12103 provided to the side mirrors mainly acquire images on the sides of the vehicle 12100. The imaging unit 12104 provided to the rear bumper or the back door mainly acquires images behind the vehicle 12100. The imaging unit 12105 provided at the upper part of the front window in the vehicle interior is mainly used for detection of preceding vehicles, pedestrians, obstacles, traffic lights, road signs, or lanes.

FIG. 44 illustrates an example of photographing ranges of the imaging units 12101 to 12104. An imaging range 12111 indicates an imaging range of the imaging unit 12101 provided to the front nose. Imaging ranges 12112 and 12113 indicate imaging ranges of the imaging units 12102 and 12103 provided to the side mirrors, respectively. An imaging range 12114 indicates an imaging range of the imaging unit 12104 provided to the rear bumper or the back door. For example, pieces of image data taken by the imaging units 12101 to 12104 are superimposed to obtain an overhead image seen from above the vehicle 12100.

At least one of the imaging units 12101 to 12104 may have a function for acquiring distance information. For example, at least one of the imaging units 12101 to 12104 may be a stereo camera including a plurality of imaging elements, or may be an imaging element having pixels for phase difference detection.

For example, the microcomputer 12051 can determine a distance to each three-dimensional object in the imaging ranges 12111 to 12114 and a temporal change of the distance (relative speed to vehicle 12100) based on the distance information obtained from the imaging units 12101 to 12104, thereby particularly extracting, as a preceding vehicle, a three-dimensional object that is closest on a traveling road of the vehicle 12100 and is traveling at a predetermined speed (for example, 0 km/h or more) in substantially the same direction as the vehicle 12100. Furthermore, the microcomputer 12051 can set an inter-vehicular distance to be secured behind a preceding vehicle in advance to perform automatic braking control (including following stop control) and automatic acceleration control (including following start control). In this manner, the collaborative control for the purpose of automatic driving to autonomously travel independently of driver's operation can be performed.

For example, the microcomputer 12051 can classify three-dimensional object data on three-dimensional objects in to two-wheeled vehicles, standard-sized vehicles, large vehicles, pedestrians, and other three-dimensional objects such as telephone poles on the basis of distance information obtained from the imaging units 12101 to 12104 and extract the three-dimensional object data, and use the three-dimensional object data for automatic obstacle avoidance. For example, the microcomputer 12051 distinguishes obstacles around the vehicle 12100 to obstacles that can be visually recognized by a driver of the vehicle 12100 and obstacles that are difficult to be visually recognized. The microcomputer 12051 determines a collision risk indicating the degree of danger of collision with each obstacle, and in a situation where a collision risk is equal to or higher than a set value and the vehicle can possibly collide, the microcomputer 12051 can assist the driving for collision avoidance by outputting warning to the driver through the audio speaker 12061 or the display unit 12062 and performing forced deceleration and avoidance steering through the driving system control unit 12010.

At least one of the imaging units 12101 to 12104 may be an infrared camera configured to detect infrared rays. For example, the microcomputer 12051 can determine whether a pedestrian is present in images taken by the imaging units 12101 to 12104 to recognize the pedestrian. For example, the pedestrian is recognized by a procedure for extracting feature points in images taken by the imaging units 12101 to 12104 as infrared cameras and a procedure for determining whether an object is a pedestrian by performing pattern matching on a series of feature points indicating the contour of the object. When the microcomputer 12051 determines that a pedestrian is present in the images taken by the imaging units 12101 to 12104 and recognizes the pedestrian, the voice and image output unit 12052 controls the display unit 12062 to display the rectangular contour line for emphasizing the recognized pedestrian in a superimposed manner. The voice and image output unit 12052 may control the display unit 12062 to display an icon indicating a pedestrian at a desired position.

An example of the vehicle control system to which the technology according to the present disclosure may be applied has been described above. The technology according to the present disclosure may be applied to the imaging unit 12031 in the configurations described above. Specifically, by applying the technology according to the present disclosure, a measurement deviation caused by aged deterioration can be detected from ranging information obtained from the imaging unit 12031, and notified to the user.

While preferred embodiments of the present disclosure have been described above in detail with reference to the accompanying drawings, the technical scope of the present disclosure is not limited to the examples. It is obvious that a person with ordinary skills in the technical field of the present disclosure could conceive of various kinds of changes and modifications within the range of the technical concept described in the claims. It should be understood that the changes and the modifications belong to the technical scope of the present disclosure.

The effects described herein are merely demonstrative or illustrative and are not limited. In other words, the technologies according to the present disclosure could exhibit other effects obvious to a person skilled in the art from the descriptions herein together with or in place of the above-mentioned effects.

The following configurations also belong to the technical scope of the present disclosure.

(1)

A ranging sensor, comprising:
a light emitting unit configured to apply light to a target;
a light receiving unit configured to receive light from the light emitting unit reflected from the target; and
a calculation unit configured to calculate a distance from the light receiving unit to the target based on light reception data acquired by the light receiving unit, wherein
the calculation unit compares detection light reception data with predetermined data, the detection light reception data being obtained as light is emitted from the light emitting unit to a reference object provided at a predetermined distance and the light of the light emitting unit reflected by the reference object is received by the light receiving unit, and controls notification processing to a user.

(2)

The ranging sensor according to (1), wherein the predetermined data is reference data that is generated in advance as light is emitted from the light emitting unit to the reference object provided at the predetermined distance and the light of the light emitting unit reflected by the reference object is received by the light receiving unit.

(3)

The ranging sensor according to (1) or (2), wherein the calculation unit controls notification contents of the notification processing depending on a magnitude relation between the detection light reception data and the predetermined data.

(4)

The ranging sensor according to any one of (1) to (3), wherein the notification processing is performed by voice or display.

(5)

The ranging sensor according to any one of (1) to (4), wherein the calculation unit calculates a corrected distance corrected based on the detection light reception data and the predetermined data.

(6)

The ranging sensor according to any one of (1) to (5), wherein the reference object is provided, in a casing of an information processing terminal in which the ranging sensor is provided, such that the reference object is opposed to the light emitting unit and the light receiving unit.

(7)

The ranging sensor according to any one of (1) to (5), wherein
the reference object is provided to a device capable of outputting power to an information processing terminal in which the ranging sensor is provided, and
the reference object is provided, in a recess in the device in which the information processing terminal is insertable, such that the reference object is opposed to the information processing terminal.

(8)

The ranging sensor according to any one of (1) to (7), wherein the reference object is a mirror.

(9)

The ranging sensor according to any one of (1) to (8), wherein the light receiving unit receives light by at least an IR method.

(10)

A detection sensor, comprising:
a light receiving unit configured to receive light from outside; and
a calculation unit configured to process light reception data acquired by the light receiving unit,
wherein the calculation unit compares detection light reception data with predetermined data, the detection light reception data being obtained as the light receiving unit receives light from a reference object provided at a predetermined distance, and controls notification processing to a user.

(11)

The detection sensor according to (10), wherein the light receiving unit senses light by an RGB method.

(12)

The detection sensor according to (10) or (11), wherein the reference object is a black board or a light emitter.

(13)

A ranging method, comprising:
applying first light to a target;
receiving the first light reflected from the target;

calculating a distance from an irradiation point of the first light to the target based on light reception data acquired by receiving the first light;

applying second light to a reference object provided at a predetermined distance; and comparing detection light reception data with predetermined data, the detection light reception data being acquired by receiving the second light reflected by the reference object, and controlling notification processing to a user.

(14)

An electronic device, comprising a ranging sensor that protrudes from a casing when used, the ranging sensor comprising:

a light emitting unit configured to apply light to a target;

a light receiving unit configured to receive light from the light emitting unit reflected from the target; and a calculation unit configured to calculate a distance from the light receiving unit to the target based on light reception data acquired by the light receiving unit, wherein the calculation unit compares detection light reception data with predetermined data, the detection light reception data being acquired as light is emitted from the light emitting unit to a reference object provided in the casing at a predetermined distance and the light of the light emitting unit reflected by the reference object is received by the light receiving unit, and controls notification processing to a user.

REFERENCE SIGNS LIST 2 ranging sensor
3 casing
4 cradle
6 detection sensor
10 light emitting unit
20 light receiving unit
31 display region
80 mirror
84 light emitter
86 black board
100, 300 detection mechanism
110 light emitting unit
120 light receiving unit
130 control unit
140 storage unit
150 calculation unit
160 output terminal
170 subtractor
400 black level correction mechanism

The invention claimed is:

1. A ranging sensor, comprising:
a light emitter configured to apply light to a target;
a light receiver configured to receive light from the light emitter reflected from the target; and
a processor configured to calculate a distance from the light receiver to the target based on light reception data acquired by the light receiver, wherein
the processor is configured to
compares detection light reception data with predetermined data, the detection light reception data being obtained as light is emitted from the light emitter to a reference object provided at a predetermined distance and the light of the light emitter reflected by the reference object is received by the light receiver,
in response to the detection light reception data being larger than the reference data, controls notification processing to perform failure display to a user, and
in response to the detection light reception data being smaller than the reference data, control notification processing to display a request for repairing the ranging sensor to the user.

2. The ranging sensor according to claim 1, wherein the predetermined data is reference data that is generated in advance as light is emitted from the light emitter to the reference object provided at the predetermined distance and the light of the light emitter reflected by the reference object is received by the light receiver.

3. The ranging sensor according to claim 1, wherein the notification processing is performed by voice or display.

4. The ranging sensor according to claim 1, wherein the processor calculates a corrected distance corrected based on the detection light reception data and the predetermined data.

5. The ranging sensor according to claim 1, wherein the reference object is provided, in a casing of an information processing terminal in which the ranging sensor is provided, such that the reference object is opposed to the light emitter and the light receiver, and the ranging sensor protrudes from the casing when being used.

6. The ranging sensor according to claim 1, wherein
the reference object is provided to a device capable of outputting power to an information processing terminal in which the ranging sensor is provided, and
the reference object is provided, in a recess in the device in which the information processing terminal is insertable, such that the reference object is opposed to the information processing terminal.

7. The ranging sensor according to claim 1, wherein the reference object is a mirror.

8. The ranging sensor according to claim 1, wherein the light receiver receives light by at least an IR method.

9. A detection sensor, comprising:
a light receiver configured to receive light from outside; and
a processor configured to
process light reception data acquired by the light receiver,
compare detection light reception data with predetermined data, the detection light reception data being obtained as the light receiver receives light from a reference object provided at a predetermined distance,
in response to the detection light reception data being larger than the reference data, controls notification processing to perform failure display to a user, and
in response to the detection light reception data being smaller than the reference data, control notification processing to display a request for repairing the ranging sensor to the user.

10. The detection sensor according to claim 9, wherein the light receiver senses light by an RGB method.

11. The detection sensor according to claim 9, wherein the reference object is a black board or a light emitter.

12. A ranging method, comprising:
applying first light to a target;
receiving the first light reflected from the target;
calculating a distance from an irradiation point of the first light to the target based on light reception data acquired by receiving the first light;
applying second light to a reference object provided at a predetermined distance;
comparing detection light reception data with predetermined data, the detection light reception data being acquired by receiving the second light reflected by the reference object, in response to the detection light reception data being larger than the reference data, controlling notification processing to perform failure display to a user, and in response to the detection light reception data being smaller than the reference data, controlling notification processing to display a request for repairing the ranging sensor to the user.

13. An electronic device, comprising a ranging sensor that protrudes from a casing when used, the ranging sensor comprising:
- a light emitter configured to apply light to a target;
- a light receiver configured to receive light from the light emitter reflected from the target; and
- a processor configured to
  - calculate a distance from the light receiver to the target based on light reception data acquired by the light receiver,
  - compare detection light reception data with predetermined data, the detection light reception data being acquired as light is emitted from the light emitter to a reference object provided in the casing at a predetermined distance and the light of the light emitter reflected by the reference object is received by the light receiver,
  - in response to the detection light reception data being larger than the reference data, controls notification processing to perform failure display to a user, and
  - in response to the detection light reception data being smaller than the reference data, control notification processing to display a request for repairing the ranging sensor to the user.

* * * * *